(12) United States Patent
Huang et al.

(10) Patent No.: US 12,159,007 B1
(45) Date of Patent: Dec. 3, 2024

(54) METHODOLOGY AND APPLICATION OF SAMPLED LOW NOISE REFERENCE VOLTAGE

(71) Applicant: Apple Inc., Cupertino, CA (US)

(72) Inventors: Bin Huang, San Jose, CA (US);
Stanley B. Wang, Cupertino, CA (US);
Christoph H. Krah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 17/932,634

(22) Filed: Sep. 15, 2022

Related U.S. Application Data

(60) Provisional application No. 63/261,631, filed on Sep. 24, 2021.

(51) Int. Cl.
| | | |
|---|---|---|
| *G06F 3/041* | (2006.01) | |
| *G06F 3/044* | (2006.01) | |
| *G09G 3/32* | (2016.01) | |

(52) U.S. Cl.
CPC ........ *G06F 3/04182* (2019.05); *G06F 3/0412* (2013.01); *G06F 3/04166* (2019.05); *G09G 3/32* (2013.01); *G06F 3/0445* (2019.05); *G09G 2310/0291* (2013.01); *G09G 2320/029* (2013.01); *G09G 2330/06* (2013.01); *G09G 2354/00* (2013.01)

(58) Field of Classification Search
CPC ............... G06F 3/04182; G06F 3/0412; G06F 3/04166; G09G 3/32; G09G 3/0445; G09G 2310/0291; G09G 2320/029; G09G 2354/00

USPC .................. 345/713, 661; 324/259
See application file for complete search history.

(56) References Cited

U.S. PATENT DOCUMENTS

| | | | | |
|---|---|---|---|---|
| 5,706,004 | A | * 1/1998 | Yeung | H03M 1/0827 341/122 |
| 5,943,290 | A | * 8/1999 | Robinson | G11C 27/024 341/122 |
| 8,274,491 | B2 | * 9/2012 | Souchkov | G06F 3/0416 345/173 |
| 8,890,817 | B2 | 11/2014 | Wilson et al. | |
| 9,569,035 | B1 | 2/2017 | Lee et al. | |

(Continued)

FOREIGN PATENT DOCUMENTS

| | | |
|---|---|---|
| JP | 2014-209292 A | 11/2014 |
| KR | 10-2012-0083168 A | 7/2012 |
| WO | 2017/134097 A1 | 8/2017 |

*Primary Examiner* — Prabodh M Dharia
(74) *Attorney, Agent, or Firm* — Kubota & Basol LLP

(57) ABSTRACT

An electronic device including a touch screen (e.g., an integrated touch screen using chiplets) can be configured for low-noise reference voltage sampling and subsequent touch sensing using the sampled reference voltage. An integrated touch screen can include multiple regions, and each of the multiple regions can include multiple touch node electrodes. Chiplets can be configured to sample one or more reference voltage pins during an analog quiet time to obtain one or more sampled low-noise reference signals localized to each chiplet. The chiplets can then be configured to sense capacitance at some of or at each of the regions (e.g., using chiplets coupled to some of the touch node electrodes of each of the regions and configured to operate in a touch sensing configuration) using the one or more sampled low-noise reference signals.

20 Claims, 12 Drawing Sheets

(56) References Cited

U.S. PATENT DOCUMENTS

| | | | |
|---|---|---|---|
| 9,836,079 B2 | 12/2017 | Wilson et al. | |
| 9,866,237 B1 * | 1/2018 | Thinakaran | H03H 19/004 |
| 10,095,906 B2 | 10/2018 | Benkley et al. | |
| 10,122,346 B2 | 11/2018 | Shan et al. | |
| 10,152,187 B2 | 12/2018 | Krah | |
| 10,554,215 B1 | 2/2020 | Mcgibney et al. | |
| 2005/0162408 A1 * | 7/2005 | Martchovsky | G06F 3/0443 |
| | | | 345/173 |
| 2015/0138115 A1 | 5/2015 | Jang et al. | |
| 2017/0068362 A1 * | 3/2017 | Den Boer | H01L 25/0753 |
| 2017/0070197 A1 * | 3/2017 | Sivonen | H03F 3/265 |
| 2017/0277315 A1 * | 9/2017 | Wu | G06F 3/0443 |
| 2020/0033979 A1 * | 1/2020 | Sauer | G06F 3/0412 |
| 2020/0210673 A1 | 7/2020 | Krah et al. | |

* cited by examiner

METHODOLOGY AND APPLICATION OF SAMPLED LOW NOISE REFERENCE VOLTAGE

CROSS-REFERENCE RELATED APPLICATIONS

This application claims the benefit of U.S. Provisional Application No. 63/261,631, filed Sep. 24, 2021, the content of which is incorporated herein by reference in its entirety for all purposes.

FIELD OF DISCLOSURE

This relates generally to an electronic device using reference voltages, and more particularly to an electronic device including integrated micro circuitry configurable for sampling low noise reference voltage for touch and/or proximity sensing.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electric fields used to detect touch can extend beyond the surface of the display, and objects approaching near the surface may be detected near the surface without actually touching the surface.

Capacitive touch sensor panels can be formed by a matrix of transparent, semi-transparent, or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stack up (i.e., the stacked material layers forming the display pixels). In some examples, a touch screen can include micro circuitry (e.g., chiplets) including touch sensing circuitry.

In some cases, parasitic or stray capacitances can exist between the touch node electrodes used for sensing touch on the touch sensor panels, and other components of the devices in which the touch sensor panels are included, which can be referenced to a chassis ground (also referred to herein as device ground or earth ground). These parasitic or stray capacitances can introduce errors and/or offsets into the touch outputs of the touch sensor panels. Therefore, it can be beneficial to reduce or eliminate such parasitic or stray capacitances. Additionally, with reference to touch screens utilizing micro circuitry, for example, especially micro circuitry in high-resistive supply networks, interference (e.g., various noise sources, supply ripple, bounce) can be picked up by any reference voltages being supplied to the micro circuitry or shared among the micro circuitry, thus amplifying noise and introducing errors and/or offsets into the touch outputs of the micro circuitry. Therefore, it can be beneficial to also reduce, eliminate, or prevent such noise from being introduced.

SUMMARY OF THE DISCLOSURE

This relates generally to an electronic device using sampled low-noise reference voltages, and more particularly to an electronic device including integrated micro circuitry configurable for sampling low noise reference voltage for touch and/or proximity sensing. A touch screen, such as an integrated touch screen, can include light emitting diodes or organic light emitting diodes (LEDs/OLEDs) and chiplets. In some examples, the LEDs/OLEDs and chiplets can be disposed in a visible area of the integrated touch screen. In some examples, some or all of the chiplets can be disposed outside of the visible area of the integrated touch screen. In some examples, the chiplets can include display driving circuitry and touch sensing circuitry. In some examples, the chiplets can include voltage sampling circuitry and can be further configured for sampling operations including obtaining one or more low-noise reference voltages. Although often described herein as chiplets performing both touch sensing and display functionality, in some examples, the chiplets can include separate touch chiplets configured to perform voltage sampling and/or touch sensing and display chiplets configured to perform voltage sampling and/or display functionality. The LEDs/OLEDs and chiplets can be placed on a substrate by a micro-transfer tool, for example.

The integrated touch screen can also include electrodes (e.g., ITO) disposed in the visible area of the integrated touch screen. In some examples, the electrodes can provide touch functionality (e.g., via the one or more touch chiplets) during touch sensing operation. During the touch sensing operation, touch node electrodes can be formed from groups of the electrodes and sensed.

Additionally or alternatively, an electronic device including a touch screen (e.g., an integrated touch screen using chiplets) can be configured for low-noise reference voltage sampling and subsequent touch sensing using the sampled reference voltage. In some examples, an integrated touch screen can include multiple regions, and each of the multiple regions can include multiple touch node electrodes. Chiplets can be configured to sample one or more reference voltage pins during an analog quiet time to obtain one or more sampled low-noise reference signals localized to each chiplet. The chiplets can then be configured to sense capacitance at some of or at each of the regions (e.g., using chiplets coupled to some of the touch node electrodes of each of the regions and configured to operate in a touch sensing configuration) using the one or more sampled low-noise reference signals. As a result, localized touch can be effectively and reliably captured for the electronic device. Additionally, on-chip impacts of interference events may be minimized or prevented, resulting in improved touch and/or proximity sensing.

Additionally or alternatively, an electronic device including a touch screen (e.g., an integrated touch screen using chiplets) can be configured for frequency response demodulation and signal filtering for detection of touch and/or proximity events at or near the touch screen. In some examples, an integrated touch screen can include multiple regions, and each of the multiple regions can include multiple touch node electrodes. Chiplets can be configured to sense capacitance at some of or at each of the regions (e.g., using chiplets coupled to some of the touch node electrodes of each of the regions and configured to operate in a touch sensing configuration). The chiplets can then be configured to, using analog demodulation circuitry, apply one or more gated demodulation signals to the touch signals (e.g., corresponding to the sensed capacitance at the touch node electrodes) to adjust the demodulation frequency response. As a result, thermal drift may be reduced. Additionally or alternatively, the chiplets can be configured to filter digital data corresponding to the touch signals using a two-stage, cascaded decimation filter. In some examples, the two-stage, cascaded decimation filter of each chiplet includes a first decimation filter and a second decimation filter each having a configurable decimation rate and configured to filter the digital data with the analog demodulator operating, or with the analog demodulator being bypassed. As a result, chiplet space occupancy may be improved.

DETAILED DESCRIPTION

Figure 1A:
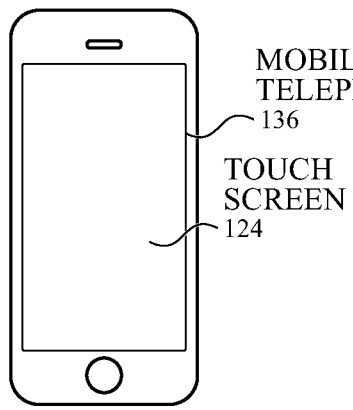
FIGS. 1A-1E illustrate example systems in which an integrated touch screen according to examples of the disclosure may be implemented.

In the following description of examples, reference is made to the accompanying drawings which form a part hereof, and in which it is shown by way of illustration specific examples that can be practiced. It is to be understood that other examples can be used, and structural changes can be made without departing from the scope of the disclosed examples.

This relates generally to an electronic device using sampled low-noise reference voltages, and more particularly to an electronic device including integrated micro circuitry configurable for sampling one or more reference voltages for touch and/or proximity sensing. A touch screen, such as an integrated touch screen, can include light emitting diodes or organic light emitting diodes (LEDs/OLEDs) and chiplets. In some examples, the LEDs/OLEDs and chiplets can be disposed in a visible area of the integrated touch screen. In some examples, some or all of the chiplets can be disposed outside of the visible area of the integrated touch screen. In some examples, the chiplets can include voltage-sampling circuitry ("voltage-sampling circuitry," "sampling circuitry"). In some examples, the chiplets can include display-driving circuitry and touch sensing circuitry. Although often described herein as chiplets performing voltage sampling and touch sensing and/or display functionality, in some examples, the chiplets can include separate touch chiplets configured to perform voltage sampling and touch sensing and display chiplets configured to perform voltage sampling and display functionality. The LEDs/OLEDs and chiplets can be placed on a substrate by a micro-transfer tool, as an example.

The integrated touch screen can also include electrodes (e.g., ITO) disposed in the visible area of the integrated touch screen. The electrodes can provide touch functionality (e.g., via the one or more touch chiplets) during touch sensing operation. During the touch sensing operation, touch node electrodes can be formed from groups of the electrodes and sensed.

Additionally or alternatively, an electronic device including chiplets and a touch screen (e.g., an integrated touch screen) can be configured for low-noise reference voltage sampling and subsequent touch sensing using the chiplets. For example, the integrated touch screen can include multiple regions, and each of the multiple regions can include multiple touch node electrodes. The chiplets can be configured to sample one or more reference voltage pins during an analog quiet time to obtain one or more sampled low-noise reference signals localized to each chiplet. The chiplets can then be configured to sense capacitance at some of or at each of the regions (e.g., using chiplets coupled to some of the touch node electrodes of each of the regions and configured to operate in a touch sensing configuration) using the one or more sampled low-noise reference signal. As a result, localized touch can be effectively and reliably captured for the electronic device. Additionally, on-chip impacts of interference events may be minimized or prevented, resulting in improved touch and/or proximity sensing.

Additionally or alternatively, an electronic device including a touch screen (e.g., an integrated touch screen using chiplets) can be configured for frequency response demodulation and signal filtering for detection of touch and/or proximity events at or near the touch screen. In some examples, an integrated touch screen can include multiple regions, and each of the multiple regions can include multiple touch node electrodes. Chiplets can be configured to sense capacitance at some of or at each of the regions (e.g., using chiplets coupled to some of the touch node electrodes of each of the regions and configured to operate in a touch sensing configuration). The chiplets can then be configured to, using analog demodulation circuitry, apply one or more gated demodulation signals to the touch signals (e.g., corresponding to the sensed capacitance at the touch node electrodes) to adjust the demodulation frequency response. As a result, thermal drift may be reduced. Additionally or alternatively, the chiplets can be configured to filter digital data corresponding to the touch signals using a two-stage, cascaded decimation filter. In some examples, the two-stage, cascaded decimation filter of each chiplet includes a first decimation filter and a second decimation filter each having a configurable decimation rate and configured to filter the digital data with the analog demodulator operating, or with the analog demodulator being bypassed. As a result, chiplet space occupancy may be improved.

Figure 1B:
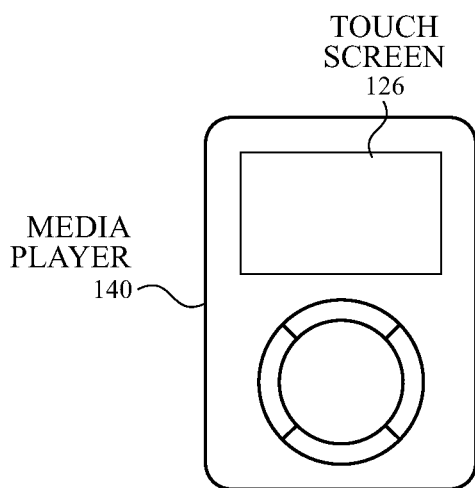
Figure 1C:
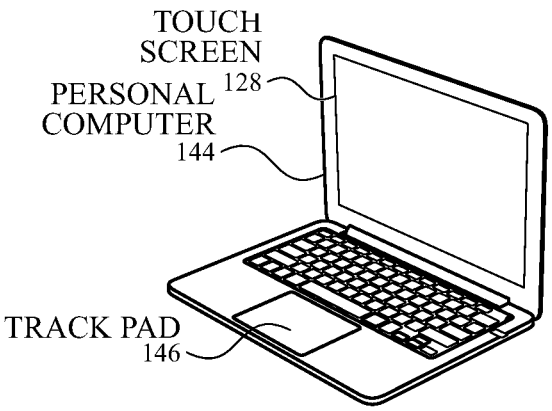
Figure 1D:
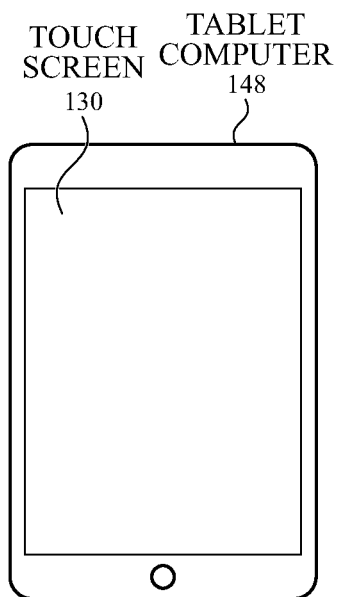
Figure 1E:
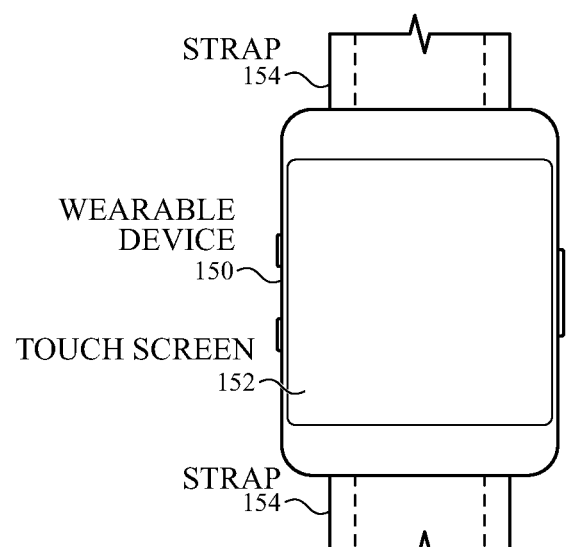

FIGS. 1A-1E illustrate example systems in which an integrated touch screen according to examples of the disclosure may be implemented. FIG. 1A illustrates an example mobile telephone 136 that includes an integrated touch screen 124. FIG. 1B illustrates an example digital media player 140 that includes an integrated touch screen 126. FIG. 1C illustrates an example personal computer 144 that includes a trackpad 146 and an integrated touch screen 128. FIG. 1D illustrates an example tablet computer 148 that includes an integrated touch screen 130. FIG. 1E illustrates an example wearable device 150 (e.g., a watch) that includes an integrated touch screen 152. It is understood that the above integrated touch screens can be implemented in other devices as well. Additionally it should be understood that although the disclosure herein primarily focuses on integrated touch screens, some of the disclosure is also applicable to touch sensor panels without a corresponding display.

In some examples, touch screens 124, 126, 128, 130 and 152 can be based on self-capacitance. A self-capacitance-based touch system can include a matrix of small, individual plates of conductive material or groups of individual plates of conductive material forming larger conductive regions that can be referred to as touch node electrodes. For example, a touch screen can include a plurality of individual touch node electrodes, each touch node electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance-based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 152 can be based on mutual capacitance. A mutual capacitance-based touch system can include electrodes arranged as drive and sense lines that may cross over each other on different layers or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance-based touch system can form touch nodes from a matrix of small, individual plates of conductive material.

In some examples, touch screens 124, 126, 128 and 130 can be based on mutual capacitance and/or self-capacitance. The electrodes can be arranged as a matrix of small, individual plates of conductive material or as drive lines and sense lines, or in another pattern. The electrodes can be configurable for mutual capacitance or self-capacitance sensing or a combination of mutual and self-capacitance sensing. For example, in one mode of operation, electrodes can be configured to sense mutual capacitance between electrodes, and in a different mode of operation, electrodes can be configured to sense self-capacitance of electrodes. In some examples, some of the electrodes can be configured to sense mutual capacitance therebetween and some of the electrodes can be configured to sense self-capacitance thereof.

Figure 2A:
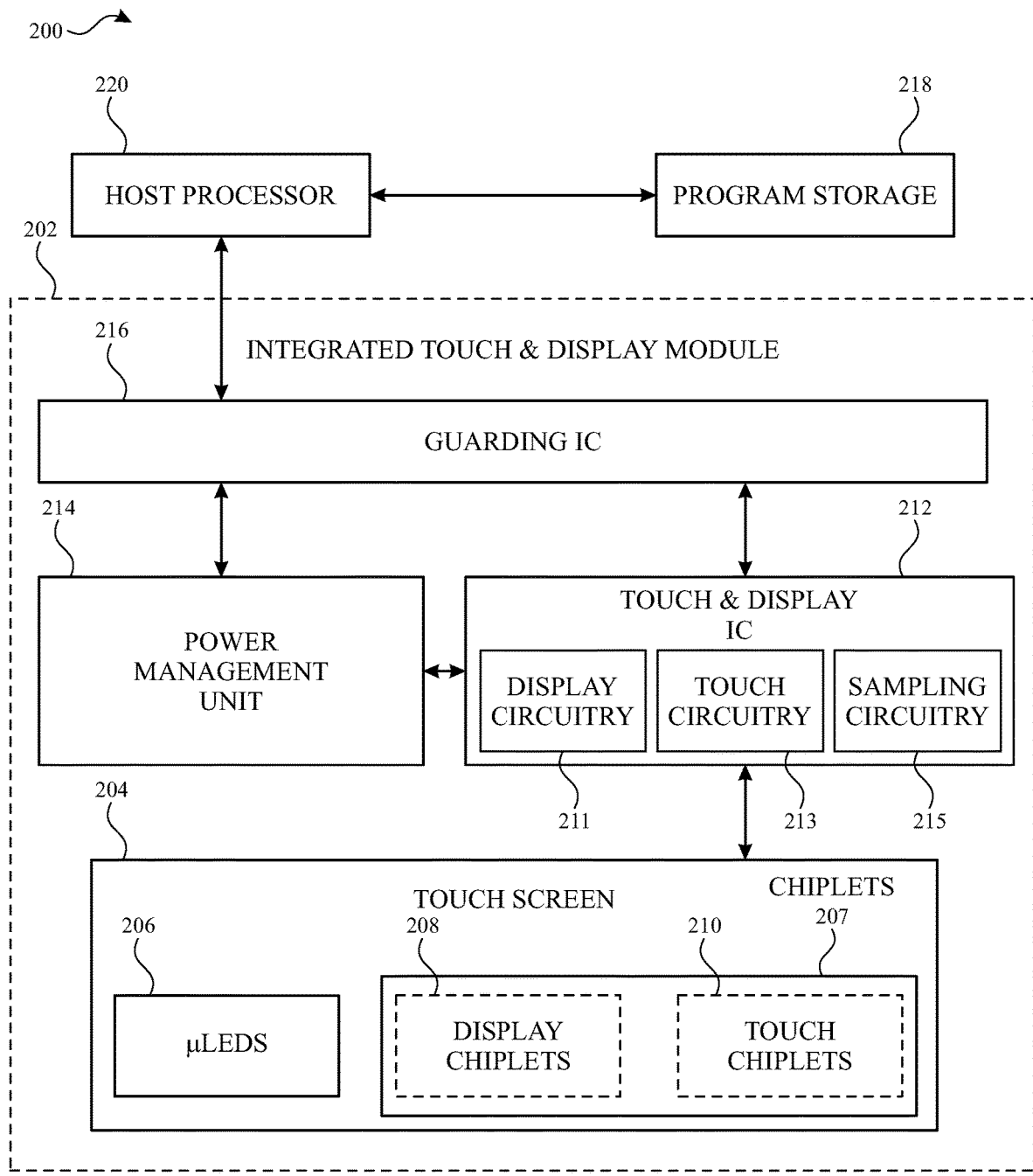
FIG. 2A is a block diagram of an example computing system that illustrates one implementation of an example integrated touch screen according to examples of the disclosure.

FIG. 2A is a block diagram of an example computing system 200 that illustrates one implementation of an example integrated touch screen 204 according to examples of the disclosure. As described in more detail herein, the integrated touch screen 204 can include light emitting diodes (LEDs) or organic light emitting diodes (OLEDs) represented by micro-LEDs 206 and chiplets 207 (e.g., integrated chiplets including LED/OLED drivers, voltage sampling circuitry and/or touch sensing circuitry). In some examples, the functionality of chiplets can be divided into separate display chiplets 208 (e.g., including LED/OLED drivers) and touch chiplets 210 (e.g., including voltage sampling circuitry and touch sensing circuitry). Computing system 200 can be included in, for example, mobile telephone 136, digital media player 140, personal computer 144, tablet computer 148, wearable device 150 or any mobile or non-mobile computing device that includes a touch screen. Computing system 200 can include integrated touch and display module 202, host processor 220 and program storage 218. Integrated touch and display module 202 can include integrated touch screen 204 and integrated circuits for operation of integrated touch screen 204. In some examples, integrated touch and display module 202 can be formed on a single substrate with micro-LEDs 206 and chiplets 207 (or display chiplets 208 and/or touch chiplets 210) of integrated touch screen 204 on one side of the touch screen and integrated circuits controlling operation of micro-LEDs 206 and chiplets 207 mounted on an opposite side of the single substrate. Forming integrated touch and display module 202 in this way can provide for simplified manufacturing and assembly of devices with a touch screen. In some examples, the integrated touch and display module 202 can be formed on a single substrate with micro-LEDs 206 on one side of the substrate and chiplets 207 (or display chiplets 208 and/or touch chiplets 210) of integrated touch screen 204 and integrated circuits controlling operation of micro-LEDs 206 and chiplets 207 mounted on an opposite side of the single substrate.

Integrated circuits for operation of integrated touch screen 204 can include an integrated touch and display integrated circuit (touch and display controller) 212, a power management unit (PMU) 214, and optionally a guard integrated circuit (guard IC) 216. As described in more detail herein, self-capacitance touch sensing performance can be improved (and parasitic capacitance effects reduced) by performing touch sensing operations in a different power domain than in the chassis power domain. In some examples, guard IC 216 can be used to operate integrated touch and display module 202 in a guard power domain during guarded touch operation and operate touch and display module 202 in the chassis power domain otherwise (e.g., during non-guarded touch operations or during display operations). Power management unit 214 can be an integrated circuit configured to provide the voltages necessary for the touch and display controller 212, including guard-referenced power supplies when operating in a guarded power domain. The touch and display controller 212 can include circuitry to perform/control voltage sampling, touch sensing, and/or display operations (e.g., according to the voltage sampling operation illustrated in FIG. 6). Although illustrated in FIG. 2A as a single integrated circuit, the various components and/or functionality of the touch and display controller 212 can be implemented with multiple circuits, elements, chips, and/or discrete components (e.g., a separate touch integrated circuit 213, a separate display integrated circuit 211, and/or a separate sampling integrated circuit 215 with an integrated circuit to handle the handoff therebetween).

The touch and display controller 212 can include display circuitry 211 to perform display operations. Display circuitry 211 can include hardware to process one or more still images and/or one or more video sequences for display on integrated touch screen 204. The display circuitry 211 can be configured to generate read memory operations to read the data representing the frame/video sequence from a memory (not shown) through a memory controller (not shown), for example, or can receive the data representing the frame/video sequence from host processor 220. The display circuitry 211 can be configured to perform various processing on the image data (e.g., still images, video sequences, etc.). In some examples, the display circuitry 211 can be configured to scale still images and to dither, scale and/or perform color space conversion on the frames of a video sequence. Display circuitry 211 can be configured to blend the still image frames and the video sequence frames to produce output frames for display. The display circuitry 211 can also be more generally referred to as a display controller, display pipe, display control unit, or display pipeline. The display control unit can be generally any hardware and/or firmware configured to prepare a frame for display from one or more sources (e.g., still images and/or video sequences). More particularly, the display circuitry 211 can be configured to retrieve source frames from one or more source buffers stored in memory, composite frames from the source buffers, and display the resulting frames on integrated touch screen 204. Accordingly, the display circuitry 211 can be configured to read one or more source buffers and composite the image data to generate the output frame. Display circuitry 211 can provide various control and data signals to the display (described in more detail with respect to FIGS. 5A-5F), via chiplets 207 (or via display chiplets 208), including timing signals (e.g., one or more clock signals) and pixel selection signals. The timing signals can include a pixel clock that can indicate transmission of a pixel. The data signals can include color signals (e.g., red, green, blue) for micro-LEDs 206. The display circuitry can control integrated touch screen 204 in real-time, providing the data indicating the pixels to be displayed as the touch screen is displaying the image indicated by the frame. The interface to such an integrated touch screen 204 can be, for example, a video graphics array (VGA) interface, a high-definition multimedia interface (HDMI), a mobile industry processor interface (MIPI), a digital video interface (DVI), an LCD/LED/OLED interface, a plasma interface, or any other suitable interface.

The touch and display controller 212 can include touch circuitry 213 to perform touch operations. Touch circuitry 213 can include one or more touch processors, peripherals (e.g., random access memory (RAM) or other types of memory or storage, watchdog timers and the like), and a touch controller. The touch controller can include, but is not limited to, channel scan logic (e.g., implemented in programmable logic circuits or as discrete logic circuits) which can provide configuration and control for touch sensing operations by chiplets 207 (or by touch chiplets 210). For example, touch chiplets 210 can be configured to drive, sense and/or ground touch node electrodes depending on the mode of touch sensing operations. The mode of touch sensing can, in some examples, be determined by a scan plan stored in memory (e.g., RAM) in touch circuitry 213. The scan plan can provide a sequence of scan events to perform during a frame. The scan plan can also include information necessary for providing control signals to and programming chiplets 207 for the specific scan event to be performed, and for analyzing data from chiplets 207 according to the specific scan event to be performed. The scan events can include, but are not limited to, a mutual capacitance scan, a self-capacitance scan, a stylus scan, touch spectral analysis scan, and a stylus spectral analysis scan. The channel scan logic or other circuitry in touch circuitry 213 can provide the stimulation signals at various frequencies and phases that can be selectively applied to the touch node electrodes of integrated touch screen 204 or used for demodulation, as described in more detail below. The touch circuitry 213 can also receive touch data from the chiplets 207 (or touch chiplets 210), store touch data in memory (e.g., RAM), and/or process touch data (e.g., by one or more touch processors or touch controller) to determine locations of touch and/or clean operating frequencies for touch sensing operations (e.g., spectral analysis).

In some examples, the channel can logic or other circuitry in touch circuitry 213 can provide control for voltage sampling operations as described herein. In some examples, the touch and display controller 212 can include sampling circuitry (voltage sampling circuitry) 215 to perform voltage sampling operations. In some such examples, sampling circuitry 215 can include one or more touch sampling processors, peripherals (e.g., random access memory (RAM) or other types of memory or storage, watchdog timers and the like), and a touch sampling controller. The touch controller can include, but is not limited to, sampling logic (e.g., implemented in programmable logic circuits or as discrete logic circuits) which can provide configuration and control for sampling operations by chiplets 207 (or by touch chiplets 210 and/or display chiplets 208). The sampling logic or other circuitry in sampling circuitry 215 can provide timing and control signals that can be applied to operate switches to sample one or more sampling capacitors, as described in more detail when referring to FIGS. 5-7. The sampling circuitry 215 can also receive information from the touch circuitry 213 and/or display circuitry 211 and/or from the chiplets 207 to determine a quiet time (e.g., an analog quiet time).

Integrated touch screen 204 can be used to derive touch data at multiple discrete locations of the touch screen, referred to herein as touch nodes. For example, integrated touch screen 204 can include touch sensing circuitry that can include a capacitive sensing medium having a plurality of electrically isolated touch node electrodes. Touch node electrodes can be coupled to chiplets 207 (or touch chiplets 210) for touch sensing by sensing channel circuitry. As used herein, an electrical component "coupled to" or "connected to" another electrical component encompasses a direct or indirect connection providing electrical path for communication or operation between the coupled components. Thus, for example, touch node electrodes of integrated touch screen 204 may be directly connected to chiplets 207 or indirectly connected to chiplets 207 (e.g., connected to touch chiplets 210 via display chiplets 208), but in either case provided an electrical path for driving and/or sensing the touch node electrodes. Labeling the conductive plates (or groups of conductive plates) used to detect touch as touch node electrodes corresponding to touch nodes (discrete locations of the touch screen) can be particularly useful when integrated touch screen 204 is viewed as capturing an "image" of touch (or "touch image"). The touch image can be a two-dimensional representation of values indicating an amount of touch detected at each touch node electrode corresponding to a touch node in integrated touch screen 204. The pattern of touch nodes at which a touch occurred can be thought of as a touch image (e.g., a pattern of fingers touching the touch screen). In such examples, each touch node electrode in a pixelated touch screen can be sensed for the corresponding touch node represented in the touch image.

Host processor 220 can be connected to program storage 218 to execute instructions stored in program storage 218 (e.g., a non-transitory computer-readable storage medium). Host processor 220 can provide, for example, control and data signals so that touch and display controller 212 can generate a display image on integrated touch screen 204, such as a display image of a user interface (UI). Host processor 220 can also provide control signals to the sampling circuitry 215 to sample one or more low-noise reference voltages for use in touch sensing operations, for example. Host processor 220 can also receive outputs from touch and display controller 212 (e.g., touch inputs from the one or more touch processors, etc.) and perform actions based on the outputs. The touch input can be used by computer programs stored in program storage 218 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 220 can also perform additional functions that may not be related to touch processing and display.

Note that one or more of the functions described herein, including the configuration and operation of chiplets, can be performed by firmware stored in memory (e.g., one of the peripherals in touch and display controller 212) and executed by one or more processors (in touch and display controller 212), or stored in program storage 218 and executed by host processor 220. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic, or infrared wired or wireless propagation medium.

It is to be understood that the computing system 200 is not limited to the components and configuration of FIG. 2A but can include other or additional components in multiple configurations according to various examples. Additionally, the components of computing system 200 can be included within a single device or can be distributed between multiple devices. In some examples, PMU 214 and guard IC 216 can be integrated into a power management and guard integrated circuit. In some examples, the power management and guard integrated circuit can provide power supplies (e.g., guard referenced) and the guard signal to touch screen 204 directly rather than via touch and display IC 212. In some examples, touch and display IC 212 can be coupled to host processor 220 directly, and a portion of touch and display IC 212 in communication with chiplets 207 can be included in an isolation well (e.g., a deep N-well isolation) referenced to the guard signal from guard IC 216.

As described herein, in some examples integrated touch and display module 202 can perform touch sensing operations (e.g., self-capacitance scans) in a different power domain than in the chassis power domain. In some examples, integrated touch and display module 202 can perform non-guarded touch sensing operations (e.g., mutual capacitance scans) or display operations in the chassis power domain.

Figure 2B:
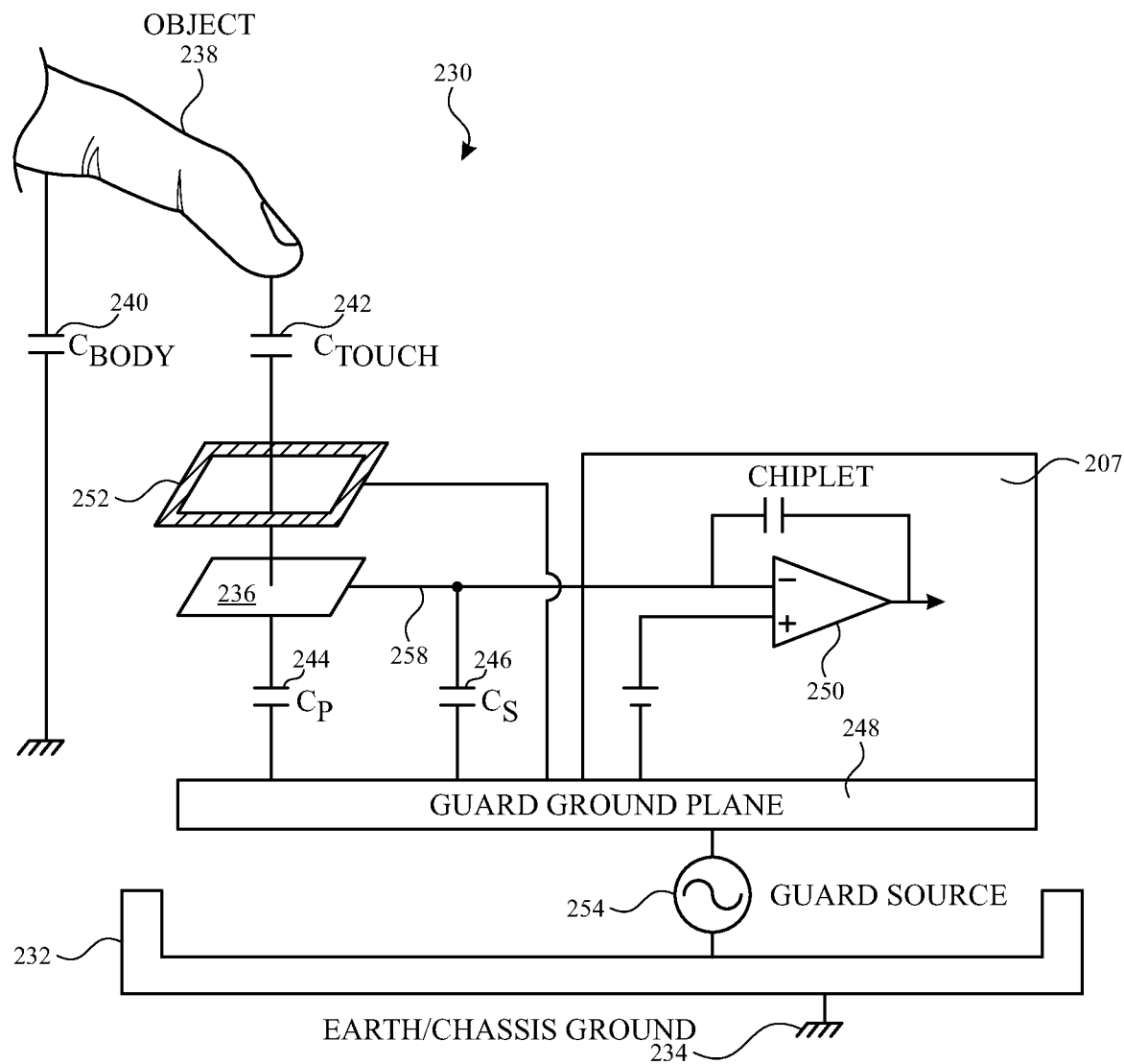
FIG. 2B illustrates an example touch sensing configuration including various associated capacitances according to examples of the disclosure.

FIG. 2B illustrates an example touch sensing configuration 230 including various associated capacitances according to examples of the disclosure. In configuration 230 of FIG. 2B, the touch sensing circuitry of integrated touch screen 204 can be referenced to a guard ground rather than a chassis ground. Specifically, in configuration 230 of FIG. 2B, touch sensing circuitry (e.g., sense amplifier 250) in chiplet 207 (or touch chiplet 210) can be coupled to a touch node electrode 236 by a routing trace 258. Chiplet 207 can be disposed or fabricated on a substrate including a guard ground plane 248 ("guard plane"), which can represent a virtual ground plane of touch chiplet 210 that is different from chassis ground 234 (also referred to herein as earth ground or device ground). In particular, stimulation source 254 ("guard source") disposed in guard IC 216, for example, can be referenced to chassis ground 234, and can output a guard voltage (e.g., a guard stimulation signal, such as a square or trapezoid wave) that can establish the voltage at guard plane 248. In this manner, the guard plane 248 acting as a guard ground for chiplet 207 can be referenced to the guard voltage. Because chiplet 207 can be mounted on a substrate including guard plane 248, the sense amplifier in chiplet 207 can be referenced to the guard signal (and receive other guard-referenced voltages produced by PMU 214, for example), and can be isolated from chassis ground 234 by guard plane 248. In this way, chiplet 207 (or touch chiplet 210) can operate in the guard power domain, whereas the guard source 254 (e.g., in guard IC 216) can operate in the chassis power domain. Guard plane 248 can be any conductive material of a substrate on which chiplet 207 can be disposed or fabricated (e.g., silver, copper, gold, etc.). For example, chiplet 207 may be assembled on a printed circuit board (PCB) and may be referenced to the PCB ground plane 248 driven, during guarded self-capacitance scans, by guard source 254. Guard source 254 can be implemented, for example, using a waveform generator (e.g., generating arbitrary waveforms, such as a square wave referenced to chassis ground 234) whose output can be inputted in to a digital-to-analog converter (DAC). Analog output from the DAC can be provided to a linear buffer (e.g., with unity or some other gain) whose output can correspond to the output of guard source 254.

Additionally, guard plane 248 can be disposed between touch node electrode 236 and chassis 232 (or, more generally, chassis ground 234), and guard plane 248 can be disposed between a routing trace that couples touch node electrode 236 to chiplet 207 and chassis 232 (or, more generally, chassis ground 234). Thus, guard plane 248 can similarly isolate touch node electrode 236 and routing trace 258 that couples touch node electrode 236 to chiplet 207 from chassis ground 234. Guard plane 248 can reduce or eliminate parasitic or stray capacitances that may exist between touch node electrode 236 and chassis ground 234, as will be described below. Optionally, a guard plane can be included in a layer above the touch node electrodes and/or between touch node electrodes (e.g., as illustrated by guard plane 252) and can be referenced to the same guard voltage. Guard plane 252 can include openings corresponding to touch node electrodes to enable detection of touch activity on the touch sensor panel (or proximity activity) while guarding the touch node electrodes and routing from stray capacitances that can form due to a touch or other stray capacitances. In some examples, the material(s) out of which guard planes 248 and 252 are made can be different. For example, guard plane 252 above the touch node electrodes can be made of ITO, or another fully or partially transparent conductor), and guard planes 248 in the substrate (e.g., PCB) can be made of a different conductor, such as copper, aluminum, or other conductor that may or may not be transparent.

Various capacitances associated with touch and/or proximity detection using configuration 230 are also shown in FIG. 2B. Specifically, an object 238 (e.g., a finger) can be touching or in proximity to touch node electrode 236. Object 238 can be grounded to earth ground 234 through capacitance 240 (e.g., $C_{body}$), which can represent a capacitance from object 238 through a user's body to earth ground 234. Capacitance 242 (e.g., $C_{touch}$) can represent a capacitance between object 238 and touch node electrode 236, and can be the capacitance of interest in determining how close object 238 is to touch node electrode 236. Typically, $C_{body}$ 240 can be significantly larger than $C_{touch}$ 242 such that the equivalent series capacitance seen at touch node electrode 236 through object 238 can be approximately $C_{touch}$ 242. Capacitance 242 can be measured by touch sensing circuitry (e.g., sense amplifier 250) included in chiplet 207 (or touch chiplet 210) to determine an amount of touch at touch node electrode 236 based on the sensed touch signal, for example. As shown in FIG. 2B, touch sensing circuitry in chiplet 207 can be referenced to guard ground (with some DC biasing provided by the chiplet 207 and/or PMU 214). In some examples, capacitance 244 (e.g., $C_p$) can be a parasitic capacitance between touch node electrode 236 and guard plane 248. Capacitance 246 (e.g., $C_s$) can be a stray capacitance between routing trace 258 coupled to touch node electrode 236 and guard plane 248, for example. In some examples, the impact of capacitances 244 and 246 on a sensed touch signal can be mitigated because guard plane 248 and touch sensing circuitry in chiplet 207 are all referenced to the virtual ground signal produced by guard source 254 during a guarded self-capacitance scan.

When guarded, the voltage at touch node electrode 236 and trace 258 can mirror or follow the voltage at guard plane 248, and thereby capacitances 244 and 246 can be reduced or eliminated from the touch measurements performed by chiplet 207 (or touch chiplet 210). Without stray capacitances 244 and 246 affecting the touch measurements, the offset in the output signal of sense amplifier 250 (e.g., when no touch is detected at touch node electrode 236) can be greatly reduced or eliminated, which can increase the signal to noise ratio and/or the dynamic range of sense circuitry in chiplet 207. This, in turn, can improve the ability of touch sensing circuitry in chiplet 207 to detect a greater range of touch at touch node electrode 236, and to accurately detect smaller capacitances $C_{touch}$ 242 (and, thus, to accurately detect proximity activity at touch node electrode 236 at larger distances). Additionally, with a near-zero offset output signal from touch sensing circuitry in chiplet 207, the effects of drift due to environmental changes (e.g., temperature changes) can be greatly reduced. For example, if the signal out of sense amplifier 250 consumes 50% of its dynamic range due to undesirable/un-guarded stray capacitances in the system, and the analog front end (AFE) gain changes by 10% due to temperature, the sense amplifier 250 output may drift by 5% and the effective signal-to-noise ratio (SNR) can be limited to 26 dB. By reducing the undesirable/un-guarded stray capacitances by 20 dB, the effective SNR can be improved from 26 dB to 46 dB accordingly.

Figure 2C:
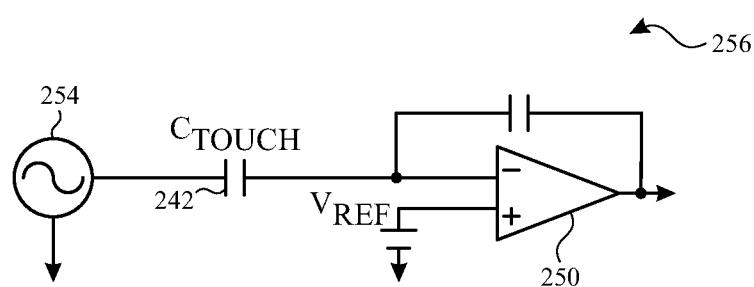
FIG. 2C illustrates an example equivalent circuit diagram of an example touch sensing configuration according to examples of the disclosure.

FIG. 2C illustrates an example equivalent circuit diagram of an example touch sensing configuration 256 according to examples of the disclosure. As described herein, guarding can reduce or eliminate capacitances 244 and 246 from the touch measurements performed by touch sensing circuitry in chiplet 207. As a result, the sense amplifier 250 can simply detect $C_{touch}$ 242, which can appear as a virtual mutual capacitance between object 238 and touch node electrode 236. Specifically, object 238 can appear to be stimulated (e.g., via $C_{body}$ 240) by guard source 254, and object 238 can have $C_{touch}$ 242 between it and the inverting input of sense amplifier 250. Changes in $C_{touch}$ 242 can, therefore, be sensed by sense amplifier 250 as changes in the virtual mutual capacitance $C_{touch}$ 242 between object 238 and sense amplifier 250. As such, the offset in the output signal of sense amplifier 250 (e.g., when no touch is detected at touch node electrode 236) can be greatly reduced or eliminated, as described above. As a result, sense amplifier 250 (e.g., the input stage of touch sensing circuitry of chiplet 207) need not support as great a dynamic input range that self-capacitance sense circuitry might otherwise need to support in circumstances/configurations that do not exhibit the virtual mutual capacitance effect described here.

Because the self-capacitance measurements of touch node electrodes in self-capacitance-based touch screen configurations can exhibit the virtual mutual capacitance characteristics described above, chiplet 210 can be designed with a simpler sensing architecture to support both self-capacitance measurements and mutual capacitance measurements. An example configuration of the touch sensing circuitry for chiplet 207 (or touch chiplet 210) is described herein with respect to FIG. 5A.

Referring back to FIG. 2A, integrated touch screen 204 can be integrated such that touch sensing circuit elements of the touch sensing system can be integrated with the display stack-up and some circuit elements can be shared between touch and display operations. It is noted that circuit elements are not limited to whole circuit components, such as a whole capacitor, a whole transistor, etc., but can include portions of circuitry, such as a conductive plate.

Figure 3A:
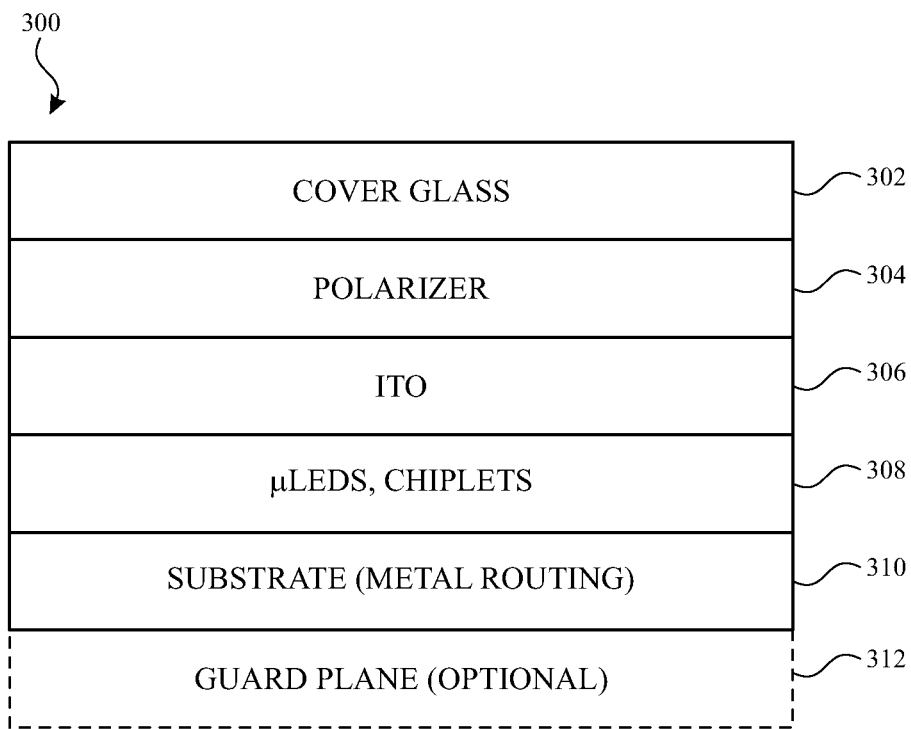
FIGS. 3A-3B illustrate example stack-ups of an integrated touch screen according to examples of the disclosure.
Figure 3B:
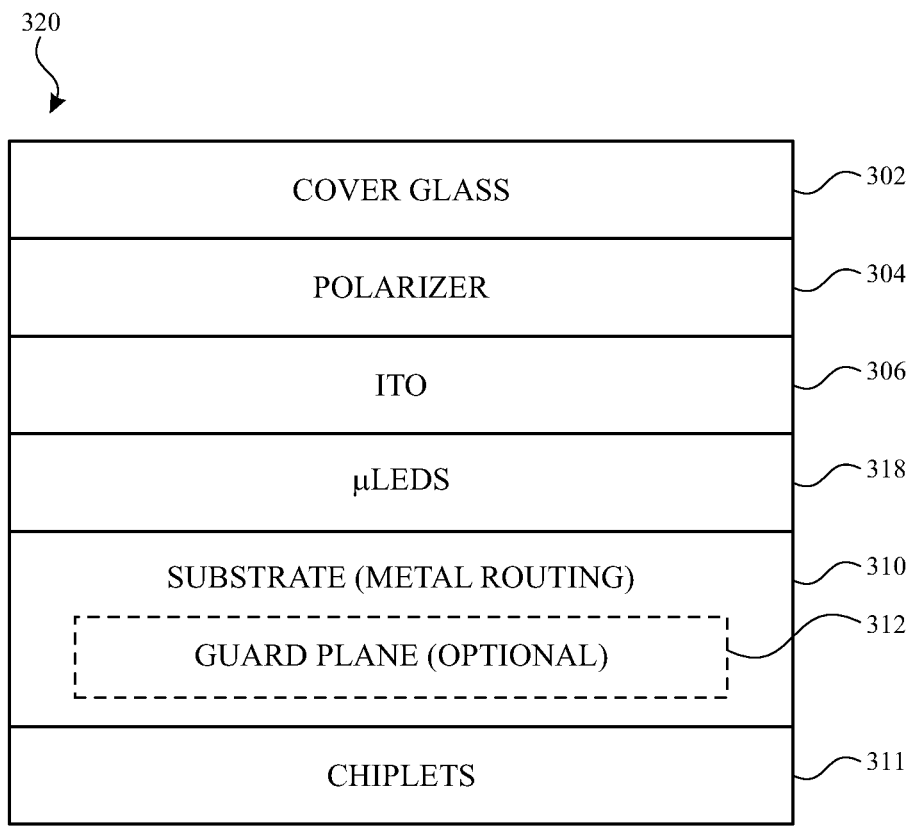

FIGS. 3A-3B illustrate example stack-ups of an integrated touch screen according to examples of the disclosure. FIG. 3A illustrates an example stack-up of a touch screen including chiplets (or touch chiplets and display chiplets) in the visible area of the display. Integrated touch screen 300 comprises a substrate 310 (e.g., a printed circuit board) upon which chiplets 207 (or touch chiplets 210 and/or display chiplets 208) and micro-LEDs 206 can be mounted in touch and display circuit layer 308. In some examples, the chiplets 207 and/or micro-LEDs 206 can be partially or fully embedded in the substrate (e.g., the components can be placed in depressions in the substrate). In some examples, the chiplets 207 can be mounted on one and/or both sides of substrate 310. For example, some or all of the chiplets 207 can be mounted on a second side of substrate 310 (or some or all of the touch chiplets 210 and/or some or all of the display chiplets 208 can be mounted on a second side of substrate 310). In some examples, the chiplets can be disposed on the second side of the substrate (opposite the first side of the substrate including micro-LEDs 206). FIG. 3B illustrates an example stack-up of a touch screen including chiplets (or touch chiplets and/or display chiplets) outside the visible area of the display. Unlike the stack-up of integrated touch screen 300, in which chiplets 207 and micro-LEDs 206 can be mounted in touch and display circuit layer 308, stack-up of integrated touch screen 320 can include chiplets mounted in a touch and display circuit layer 311 on a second (bottom) side of substrate 310 different than the micro-LEDs 206 mounted on a display pixel layer 318 on a first (top, visible) side of substrate 310. In some examples, placing the chiplets on the second side of the substrate can allow for uniform spacing of the micro-LEDs and/or increased density of micro-LEDs on the first side of substrate 310.

The substrate 310 can include routing traces in one or more layers to route signals between micro-LEDs 206, chiplets 207 and touch and display controller 212. Substrate 310 can also optionally include a guard plane 312 for guarded operation (e.g., corresponding to guard plane 248 in FIG. 2B). Although illustrated on the bottom of substrate 310 in FIG. 3A, guard plane 312 can be formed as a layer of substrate 310 other than the bottom layer (e.g., as illustrated in FIG. 3B in an internal layer of substrate 310).

After mounting micro-LEDs 206 and chiplets 207 in the touch and display circuit layer 308 in FIG. 3A (e.g., during a pick-and-place assembly), a planarization layer (e.g., transparent epoxy) can be deposited over the micro-LEDs 206 and chiplets 207. The planarization layer can be deposited over the micro-LEDs 206 in the display pixel layer 318 in the stack-up of FIG. 3B. A fully or partially transparent conductor layer 306 (e.g., ITO) can be deposited above planarized touch and display circuit layer 308 in FIG. 3A or above the display pixel layer 318 in FIG. 3B. Conductor layer 306 can include a pattern of individual conductor plates that can be used for touch and display functions of integrated touch screen 300. For example, individual conductor plates can be used as cathode terminals for micro-LEDs during display operations and groups of conductor plates can form touch node electrodes for touch operations. Polarizer 304 can be disposed above the transparent conductor layer 306 (optionally with another planarization layer disposed over the transparent conductor layer 306). Cover glass (or front crystal) 302 can be disposed over polarizer 304 and form the outer surface of integrated touch screen 300. The stack-up of integrated touch screens 300 and/or 320 can provide numerous benefits including reduced costs (e.g., due to simplified assembly of devices including integrated touch and display module 202 and a reduced number of integrated circuits by combining touch and display functionality into integrated touch and display controller 212), reduced stack-up height (sharing conductors eliminates a separate touch node electrode layer; integrating chiplets 207 (or touch chiplets 210 and display chiplets 208) into the stack-up on the same layer with the micro-LEDs does not add to the stack-up height for FIG. 3A), simplified support for guarded self-capacitance scans (by including touch circuitry 213 on integrated touch and display module 202 with a guard plane extending throughout the substrate of integrated touch and display module 202), and shrinking the border region around the touch screen (because routing can be done through the substrate rather than in the border regions).

Conductor layer 306 can include a pattern of individual conductor plates (e.g., ITO patches, as indicated). As an example, the ITO layer 306 can include a plurality of ITO patches arranged in an array (e.g., given number of rows by given number of columns). The pattern of the array of ITO patches may be a rectangular array of rectangular patches, for example, though other shapes of ITO patches and patterns can be used. Each of the ITO patches can be formed over a bank of micro-LEDs (and may therefore be referred to as ITO banks herein) and can serve as the cathode terminal for the bank of micro-LEDs during display operations.

As an example, ITO patches within the ITO layer 306 can be coupled together to form touch node electrodes for touch sensing operations. In some examples, ITO patches coupled to a chiplet (e.g., corresponding to one of chiplets 207) can be coupled using switching circuitry within the chiplet to form a touch electrode. In some examples, a group of ITO banks can be coupled to one or more display chiplets (e.g., corresponding to display chiplets 208), and groups of ITO banks can be coupled together using the display chiplets to form touch node electrodes for touch sensing operations. Each of the touch node electrodes formed from the groups of ITO banks can be coupled during touch operations to a touch chiplet (e.g., corresponding to one of touch chiplets 210).

The number of ITO patches in a touch node electrode within the ITO layer 306 can be selected according to the desired sensing resolution. Moreover, the number of ITO patches in a touch node may be limited by space available for chiplets, which can be a function of the density of LEDs/display pixels. In some examples, the touch data of a first resolution of touch nodes can be combined digitally to form a reduced resolution touch image.

Figure 4:
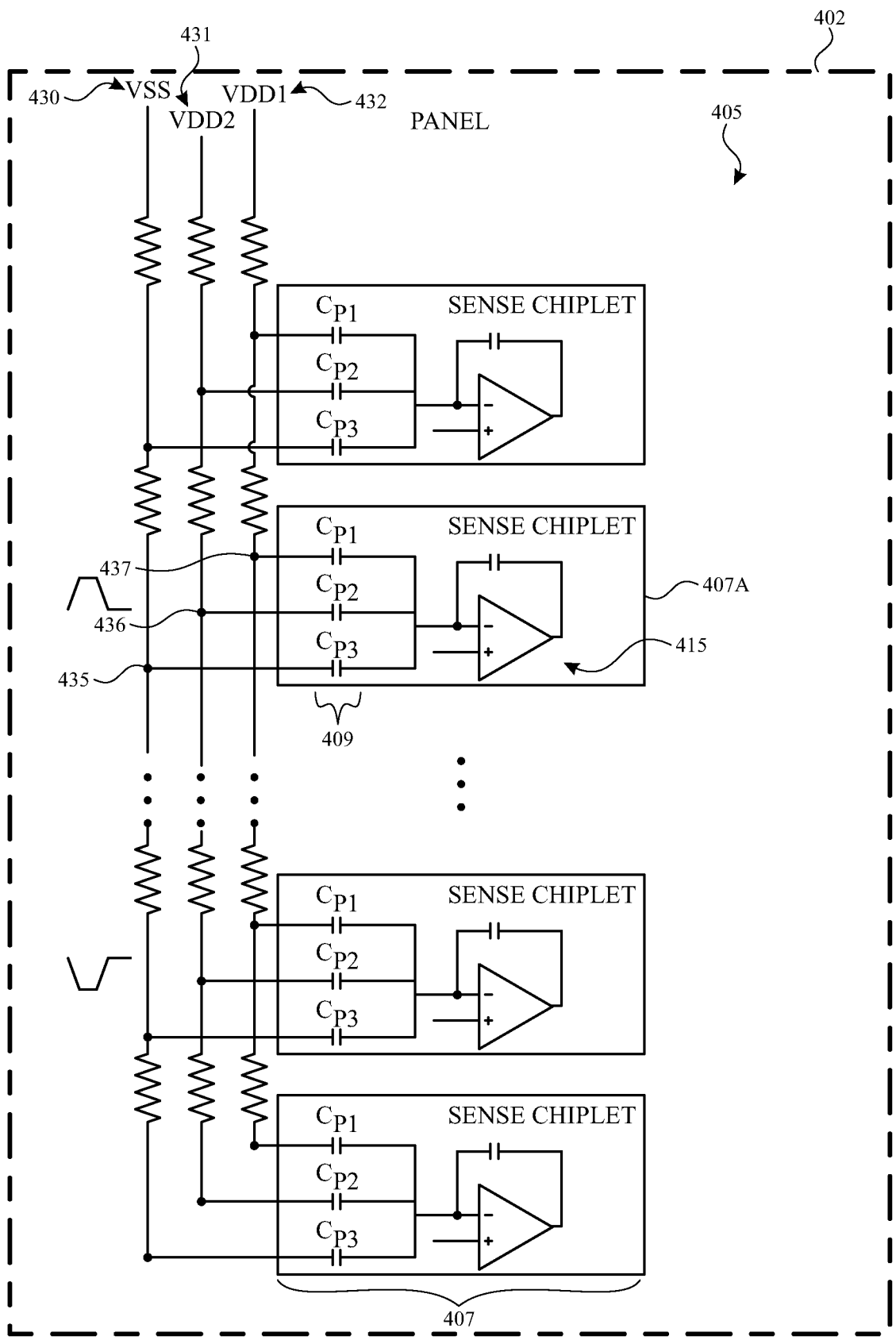
FIG. 4 illustrates an example array of chiplets of an integrated touch screen according to examples of the disclosure.

FIG. 4 illustrates an example array 405 of chiplets 407 of an integrated touch screen according to examples of the disclosure. As discussed above, an integrated touch screen of an electronic device may be implemented as a material stack up (e.g., corresponding to stack ups 300 and 320 in FIGS. 3A-3B) including chiplets (or touch chiplets and display chiplets). As shown in FIG. 4, the chiplets 407 may be arranged as an array 405 (e.g., a row/column array with a first number of chiplets arranged within a column and a second number of chiplets arranged within a row) above or below the touch screen substrate (e.g., in touch and display circuit layer 308 or 311 above or below substrate 310). While the array of chiplets 407 is depicted as being touch chiplets (e.g., corresponding to touch chiplets 210 in FIG. 2A), it should be understood that, as discussed herein, display chiplets (e.g., corresponding to display chiplets 208) may also be provided within a same or adjacent column of the array 405.

As shown, the touch chiplets 407 may each comprise exemplary touch sensing circuitry 415 configurable for detecting a touch at or near the touch panel 402 (e.g., detected via touch node electrodes (not shown)), as discussed above with reference to FIGS. 2A-2C. As discussed below, the touch sensing circuitry 415 may include or be paired with voltage sampling circuitry (not shown) configurable for sampling one or more reference voltages for referencing a respective chiplet 407. As shown in FIG. 4, the chiplets 407 may be configured to receive one or more voltage supplies via voltage supply lines 430-432 for powering an operation (e.g., touch sensing) of each of the chiplets 407. In some examples, the voltage supplies powering voltage supply lines 430-432 may be generated in the power management unit (e.g., PMU 214 in FIG. 2A). For example, three voltage supply lines 430-432 may provide voltage signals VSS, VDD2, and VDD1, respectively, to each chiplet 407 within the array 405. Accordingly, the voltage supply lines 430-432 may form a voltage supply network for the plurality of chiplets 407 described herein. As shown, each chiplet may be provided with an electrical trace electrically coupled between the voltage supply network and touch sensing circuitry 415. For example, referring to chiplet 407A of the plurality of chiplets 407, electrical trace 435 may couple touch sensing circuitry 415 to voltage line 430 (e.g., VSS), electrical trace 436 may couple touch sensing circuitry 415 to voltage line 431 (e.g., VDD2), and electrical trace 437 may couple touch sensing circuitry 415 to voltage line 432 (e.g., VDD1). In some examples, capacitances collected/stored via capacitors 409 (e.g., $C_{p1}$-$C_{p3}$) can be parasitic capacitances between each of the voltage supply lines 430-432 of the voltage supply network and the touch sensing circuitry 415. In some examples, the impact of parasitic capacitances 409 on a sensed touch signal can be mitigated using voltage sampling circuitry (not shown), as discussed in detail below.

It should be understood that the electrical connections (e.g., traces 435-437) are exemplary and that other electrical connection techniques may be employed. It should also be understood that, for a respective chiplet, the plurality of supply voltage lines may electrically couple to touch sensing circuitry 415 via additional circuit components (e.g., in place of the capacitors shown (e.g., capacitors 409)), such as input resistors (not shown). For example, discrete capacitors and/or resistors may be electrically coupled between the plurality of supply voltage lines 430-432 and the input to touch sensing circuitry 415. It should also be noted that, if display chiplets (e.g., display chiplets 208) are also provided within the array 405, the display chiplets may be electrically connected to the voltage supply network via the exemplary configuration shown (or via an alternative configuration, as needed or desired). It should also be understood that parasitic capacitors 409 could be alternatively modeled to include other parasitic components, such as parasitic resistors, for example.

As discussed above, the touch sensing circuitry 415 (and/or display circuitry) of each of the chiplets 407 may include or be paired with voltage sampling circuitry for sampling one or more reference voltages to be used by the touch sensing circuitry. As shown in FIG. 4, the touch sensing circuitry 415 may include a sense amplifier (e.g., corresponding to sense amplifier 250). As discussed previously as an example when referring to FIGS. 2A-2C, the sense amplifier (e.g., 250 in FIG. 2B) in the chiplet (e.g., chiplet 207) can be referenced to the guard signal of the guard ground plane 248 (and receive other guard-referenced voltages produced by PMU 214, for example). As discussed, referencing the sense amplifier (and thus the chiplet) to the guard signal (and thus a ground reference different from the chassis ground) can reduce or eliminate parasitic or stray capacitances (e.g., 244 and 246 in FIG. 2B) from the touch measurements performed by touch sensing circuitry in the chiplet, and may thus improve touch sensing detection at the touch panel. Despite such improvements, the touch sensing circuitry (and/or display circuitry) may still be susceptible to interference events occurring internally or externally to the device. For example, interference events can include supply and/or ground voltage noise (e.g., from the supply lines VDD1, VDD2 and/or VSS), ripple or bounce from power management unit (e.g., PMU 214), off-chip analog buffer, micro-driver on-chip supply current noise/bounce (i.e., chiplet supply current noise/bounce), backplane noise/interferer coupling at the sense amplifier input (e.g., at the non-inverting input of the sense amplifier 250), among other possibilities. These interference events can degrade the amplifier SNR and thus degrade sensor performance (e.g., touch sensing, display), and can also cause adverse system effects, such as power supply rejection (PSR) and decreased PSR temperature drift and noise performance. Further, as shown in FIG. 4, for example, because the plurality of chiplets 407 share the same voltage supply network (430-432), individual operations/actions performed by individual chiplets (e.g., 407A), as well as localized noise, bounces, etc. on the individual chiplets, can affect other neighboring chiplets through crosstalk. As the crosstalk is increased among the plurality of chiplets 407, the performance of one, some, or all chiplets 407 can be degraded. As discussed below, configuring the chiplets with voltage sampling circuitry can reduce or eliminate (and/or otherwise prevent) the above-described impacts of interference events on chiplet sensing performance.

FIGS. 5A-5E illustrate examples of sampling circuitry 502a and 502b and sensing circuitry 515 for a chiplet 507 according to examples of the disclosure. As an example, in FIG. 5A, the exemplary chiplet 507 optionally corresponds to one of a plurality of chiplets arranged in an array (e.g., corresponding to chiplet 207 in FIGS. 2A-2B or chiplets 407 of the array 405 of FIG. 4). Accordingly, the plurality of chiplets may comprise the same or similar circuitry shown in FIGS. 5A-5E, which is described in detail below. For example, chiplet 507 can include an analog front end including sensing circuitry 515 (e.g., a single-ended charge-to-voltage conversion amplifier including a feedback circuit), a single-ended-to-differential conversion circuit 512, a mixer/demodulator 514, and an analog-to-digital converter 516. The analog front end of the chiplet 507 (and optionally the plurality of chiplets 407) may be coupled to one or more touch node electrodes (e.g., touch node electrode 236) of one or more regions of the integrated touch screen (e.g., via input pin/circuitry labeled INPUT in FIG. 5A), where the one or more touch node electrodes can be configured to operate in a touch sensing configuration. Although chiplet 507 illustrates a single input pin, it is understood that chiplet 507 can include multiple pins corresponding to conductive segments coupled together to form a touch node electrode (e.g., optionally coupled together using circuitry within chiplet 507, not shown).

Additionally, chiplet 507 can include sampling circuitry 502a and/or 502b to provide a stable reference voltage to sensing circuitry 515 (and optionally to single-ended-to-differential conversion circuit 512) and/or analog-to-digital converter 516, respectively for sensing operations (e.g., for detecting a touch and/or proximity event using sensing circuitry 515). The reference inputs for the ADC 516 can be generated using ADC buffer 506, analog multiplexer (MUX) 528 and/or switched-capacitor circuitry 538. Additional details of chiplet 507 and sampling circuitry 502a and/or 502b are described below.

As discussed herein, a touch node electrode (e.g., touch node electrode 236) can have an inherent self-capacitance to ground associated with it, and also an additional self-capacitance to ground that is formed when an object, such as finger 238, is in proximity to or touching the electrode. Referring back to FIG. 2B, the total self-capacitance to ground of touch node electrode 236 can be illustrated as capacitance 242. Chiplet 507 can include a capacitance sensing circuit 515 including an operational amplifier 502 (also referred to herein as a sense amplifier) and a feedback network including a feedback capacitor 503 (e.g., corresponding to the touch circuitry 415 of touch chiplet 407A). It should be understood that other capacitance sensing circuit configurations may be employed, such as those including a feedback resistor or switched capacitor resistor as well as a feedback capacitor. A touch node electrode to be sensed can be coupled to the inverting input (−) of operational amplifier 502. For self-capacitance sensing, an AC voltage source and DC biasing can be coupled to the non-inverting input (+) of operational amplifier 502. The capacitance sensing circuit can be configured to sense changes in the total self-capacitance of the touch node electrode induced by a finger or object either touching or in proximity to the touch sensitive surface opposite the touch node electrode to be sensed. As discussed above, in some examples, capacitances stored/collected via capacitors 509 (e.g., $C_{p1}$-$C_{p3}$) can be parasitic capacitances between the supply lines 530-532 of the voltage supply network and the touch sensing circuitry 515 (e.g., input of the sense amplifier 502). Output of operational amplifier 502 can be demodulated by mixer 514, which can receive a demodulation signal matching the AC voltage source applied to the non-inverting input of operational amplifier 502, as an example.

Figure 5A:
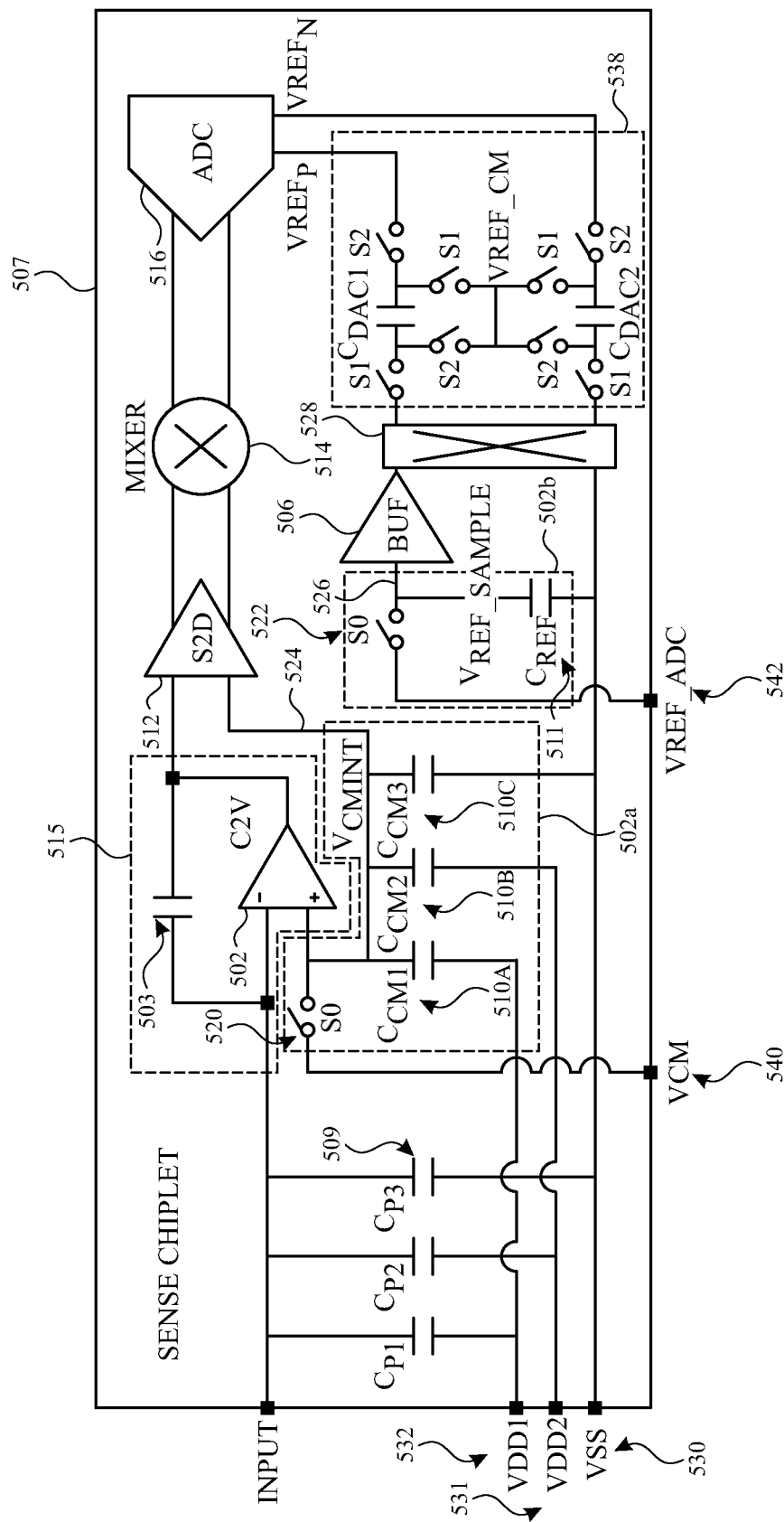
FIGS. 5A-5E illustrate examples of sampling circuitry and sensing circuitry for a chiplet according to examples of the disclosure.

In some examples, as shown in FIG. 5A, the sense amplifier 502 is optionally a single-ended charge-to-voltage conversion amplifier (e.g., C2V) and the mixer 514 is optionally a differential mixer, such that the capacitance sensing circuit further comprises a single-ended-to-differential conversion circuit (e.g., S2D) 512. As such, the output of the sense amplifier 502 is coupled to the input of the single-ended-to-differential conversion circuit 512, and differential outputs of the single-ended-to-differential conversion circuit 512 are coupled to differential inputs of the differential mixer 514, as shown. The demodulated output of the mixer 514 can be converted to a digital signal by ADC 516. As an example, the digital signal output by the ADC 516 can be filtered by one or more filters (e.g., decimation filters), described in more detail with reference to FIG. 5B, optionally including cascaded integrator-comb filter, finite input response filter, or other filters. In some examples, an anti-aliasing filter (or other digital filters described above) can be implemented as filters earlier in the signal chain and in the analog domain (e.g., prior to analog-to-digital conversion such as between mixer 514 and ADC 516). The filtered digital data can be output using a data buffer (not shown) and sent to the touch and display controller for touch processing (e.g., by one or more touch processors, discrete logic network, hardware accelerator, etc.) to determine the presence of a proximity or touch event. Although described above for self-capacitance sensing, it should be understood that the sensing channel of chiplet 507 can be used for mutual capacitance sensing.

As mentioned above, the touch sensing circuitry (i.e., capacitance sensing circuit) may be provided with voltage sampling circuitry 502a and/or 502b for minimizing effects of interference events both locally and globally across a given plurality of chiplets (e.g., the plurality of chiplets 407 in FIG. 4). As shown in FIG. 5A, one or more of the circuit components of the capacitance sensing circuit may be referenced to one or more reference voltages. As shown as an example, the sense amplifier 502 and the single-ended-to-differential conversion circuit 512 may be referenced to a first reference voltage (e.g., VCM) via a first reference voltage node/pin 540, and the ADC 516 may be referenced to a second reference voltage (e.g., VREF_ADC) via a second reference voltage node/pin 542. As discussed above, permanent electrical connections to one or more reference voltage pins/nodes (e.g., 540, 542) may allow noise, bounce, ripple, etc. caused by one or more interference events to be amplified by the circuit components of the capacitance sensing circuit (e.g., by the sense amplifier 502), which can degrade chiplet performance (e.g., by degrading system SNR), and/or cause interference between two or more chiplets (e.g., by increasing crosstalk). Accordingly, voltage sampling circuitry 502a and/or 502b may be provided between the reference voltage nodes (e.g., reference voltage input of the chiplet) and the applicable circuit components within the touch sensing circuit that use the reference voltage. As shown, the voltage sampling circuitry 502a and/or 502b may include one or more sampling/reference capacitors and one or more switches.

As shown in FIG. 5A, in some examples, the sense amplifier 502 may be provided with first voltage sampling circuitry 502a comprising a first switch 520 (also labeled S0) and three sampling capacitors 510A-510C (also labeled $C_{cm1}$-$C_{cm3}$). The first switch 520 may be electrically coupled between the non-inverting input of the sense amplifier 502 and the first reference voltage node 540. It should be understood that a capacitance of each of the sampling capacitors 510A-510C may have the equal or substantially equal capacitance values in some examples, but that in other examples, the capacitance values may be unequal. For example, in some examples in which the capacitance values are unequal, the three sampling capacitors 510A-510C may be provided with capacitance values to form a respective ratio (e.g., $C_{cm1}$:$C_{cm2}$:$C_{cm3}$). In some such examples, the respective ratio of the three sampling capacitors 510A-510C may be matched to the ratio of the parasitic capacitors 509 (e.g., the ratio of $C_{p1}$:$C_{p2}$:$C_{p3}$). Such ratio matching may minimize the impacts of supply and ground noise coupled from supply line VDD1 (532), supply line VDD2 (531) and/or ground VSS (530) to the inverting node of sense amplifier 502 through the parasitic capacitors 509. In some examples, as shown, the three sampling capacitors 510A-510C may each be coupled to the non-inverting input of the sense amplifier. For reference, the coupling can be via an intermediate common node 524 (also referred to herein as "IC node" or "first sampling node"). The voltage at the intermediate common node 524 can be represented in FIG. 5A as $V_{CMINT}$. The voltage supply lines 530-532 (e.g., corresponding to voltage supply lines 430-432) may also be coupled to the sampling capacitors 510A-510C, such that the first sampling capacitor 510A electrically couples the supply voltage node VDD1 to the IC node 524, the second sampling capacitor 510B electrically couples the supply voltage node VDD2 to the IC node 524, and the third sampling capacitor 510C electrically couples the supply voltage node VSS to the IC node 524. In some examples, the intermediate common node 524 may be shared between the non-inverting input of the sense amplifier 502 and a second input of the S2D circuit 512, such that a voltage shared by the sampling capacitors 510A-510C serves as the reference for both the sense amplifier 502 and the S2D circuit 512. As mentioned above, the voltage sampling circuitry 502a may prevent or reduce the likelihood of noise and other disturbances being amplified within the chiplet 507. As an example, the first switch 520 may be configured to be opened at certain times to prevent voltage fluctuations at the IC node 524 caused by interference picked up at the first reference voltage node 540, as discussed below.

As shown in FIG. 5A, in some examples, second voltage sampling circuitry 502b comprising a second switch 522 (e.g., S0) and a sampling capacitor 511 (e.g., $C_{ref}$) can be used for the voltage reference for the ADC 516. In such examples, the second switch 522 may be electrically coupled between the reference input of the ADC 516 (e.g., $VREF_P$) and the second reference voltage node 542. The reference input of the ADC and the second reference voltage node 542 may be separated by additional circuitry including ADC buffer 506, analog multiplexer (MUX) 528 and/or switched-capacitor circuitry 538. In some examples, analog MUX 528 includes two output ports electrically coupled to the switched-capacitor circuitry 538. In some examples, switch-capacitor circuitry 538 may be provided between the analog MUX 528/buffer 506 and the reference inputs of the ADC 516, where the switch-capacitor circuitry 538 includes a plurality of switches (labeled S1, S2) and a plurality of capacitors (labeled $C_{dac1}$ and $C_{dac2}$). In such examples, analog MUX 528 may be controlled by an output of the ADC 516 (e.g., via output circuitry (not shown) electrically coupled to a selection input for analog MUX 528) for controlling a voltage sampled onto $Ca_{dac1}$ and $Ca_{dac2}$, respectively. For example, when analog MUX 528 receives a digital high signal from the output of ADC 516, during a first phase, analog MUX 528 optionally causes switches S1 to close (e.g., with switches S2 open) to sample ground (e.g., VSS) onto $Ca_{dac2}$, and to sample the reference voltage (e.g., VREF_ADC) onto $Ca_{dac1}$. Then, during a second phase, analog MUX optionally causes switches S2 to close (e.g., with switches S1 open) to supply the reference voltage to the positive reference pin (e.g., $VREF_P$) of ADC 516 and ground to the negative reference pin (e.g., $VREF_N$) of ADC516. Additionally or alternatively, during the first phase, when analog MUX 528 receives a digital low signal from the output of ADC 516, analog MUX 528 optionally causes switches S1 to close to sample ground (e.g., VSS) onto $C_{dac1}$, and to sample the reference voltage onto $Ca_{dac2}$. Then, during the second phase, analog MUX optionally causes switches S2 to close to supply the reference voltage to the negative reference pin (e.g., $VREF_N$) of ADC 516 and ground to the positive reference pin (e.g., $VREF_P$) of ADC 516.

Additionally, as shown, the sampling capacitor 511 may be electrically coupled between the ADC buffer 506 and the voltage supply line 530 (VSS). During sampling, the sampling capacitor 511 can charge to a voltage corresponding to the second reference voltage node 542. As shown, a sampling node 526 also referred to herein as a "second sampling node" with a voltage $V_{REF\_sample}$ relative to VSS may represent a shared node between the second switch 522, the sampling capacitor 511 and the input of the ADC buffer 506, such that a voltage of the sampling capacitor 511 can serve as the reference voltage for the ADC 516. As mentioned above, the voltage sampling circuitry 502b may prevent or reduce the likelihood of noise and other disturbances being amplified within the chiplet 507. As an example, the second switch 522 may be configured to be opened at certain times to prevent voltage fluctuations at the sampling node 526 caused by interference picked up at the second reference voltage node 542, as discussed below.

As outlined above, the touch sensing circuitry 515 of the chiplet 507 may be provided with sampling circuitry 502a including one or more switches (e.g., 520, 522) and one or more sampling capacitors (e.g., 510A-510C, 511). In some examples, the touch sensing circuitry 515 may be configurable to perform a touch scan in which the touch sensing circuitry 515 may be configured to sense changes in the total self-capacitance of a touch node electrode induced by a finger or object either touching or in proximity to the touch sensitive surface opposite the touch node electrode to be sensed. In some examples, prior to the touch scan by the capacitance sensing circuit 515, the first and/or the second reference voltage nodes 540 and 542 may be sampled (e.g., while switches 520 and/or 522 are closed) to obtain a first and a second reference voltages for the sense amplifier 502, S2D circuit 512, and/or the ADC 516. It should be understood that the first and the second reference voltage nodes may be sampled concurrently or sequentially (e.g., in parallel or in series). For example, the first reference voltage node 540 may be sampled before the second reference voltage node 542, or vice versa.

As shown, the first switch 520 may electrically couple the first reference voltage node 540 to the first sampling node 524 shared by the sense amplifier 502 and the S2D circuit 512 or decouple the first reference voltage node 540 from the first sampling node 524. The second switch 522 may electrically couple the second reference voltage node 542 to the second sampling node 526 coupled to the ADC buffer 506

(and thus the ADC 516) or decouple the second reference voltage node 542 from the second sampling node 526. For example, during an analog quiet time (e.g., during a period of relatively low system activity, when a touch scan is not being performed and/or the display is not being updated/refreshed) in which the supply ripple and bounce are minimal), the first and the second switches 520 and 522 may be closed such that the first reference voltage node 540 and the second reference voltage node 542 are electrically coupled to the first sampling node 524 and the second sampling node 526, respectively. The first reference voltage node 540 and the second reference voltage node 542 may then each be sampled by charging the sampling capacitors, such that a value (e.g., VCM, VREF_ADC) of each of the first and the second reference voltage nodes is stored across the sampling capacitors. For example, a value of the first reference voltage (e.g., VCM) may be stored across the parallel combination of the sampling capacitors 510A-510C during sampling, and a value of the second reference voltage (e.g., VREF_ADC) may be stored across the sampling capacitor 511 during sampling.

After sampling, the first and the second switches 520 and 522 may then be opened, as shown in FIG. 5A, to disconnect the sampling capacitors from the reference voltage nodes for touch sensing operation. As a result, the first and the second reference voltages stored in the sampling capacitors 510A-511 are relatively or absolutely immune to voltage fluctuations at the reference voltage nodes to due external or device-internal noise sources. In this way, during the touch scan, the sense amplifier 502, the S2D circuit 512, and the ADC 516 are each referenced to a stable signal that is immune or less susceptible to noise, bounce, ripple, etc. that would otherwise be picked up by the first and the second reference nodes 540 and 542 (e.g., if first and second switches 520 and 522, respectively, were closed).

The voltage sampling circuitry 502a and 502b may help mitigate the effects of interference events originating locally on the chiplets. As an example, interference events (e.g., PSR, PSR temperature drift, noise, etc.) from the voltage supply network (e.g., supply lines 530-532) may be minimized by matching the sense amplifier 502 sampling capacitor distribution (e.g., capacitors 510A-510C) with the sense amplifier 502 parasitic capacitor distribution (e.g., capacitors 509). As shown in FIG. 5A, the sense amplifier 502 and S2D circuit 512 reference voltages (e.g., VCM) may be sampled with respect to the supply line voltages VDD1, VDD2, and VSS, via sampling capacitors 510A-510C, respectively. Sampling the first reference voltage node 540 (e.g., resulting in $V_{CMINT}$) ties the first reference voltage $V_{CMINT}$ to the supply lines 530-532, such that supply (e.g., from VDD1) and/or ground (e.g., from VSS) bounce, ripple, noise, etc. are converted to a common mode voltage fluctuation (e.g., common to the non-inverting and inverting inputs of the sense amplifier 502) to the sense amplifier 502 and the S2D circuit 512. As such, any bounce, ripple, noise, etc. at any of the supply lines 530-532 is converted to a voltage change (i.e., a voltage increase or decrease) at the first sampling node 524, but because the first sampling node 524 is shared by the sense amplifier 502 and the S2D circuit 512, the voltage change is thus the same with respect to both the sense amplifier 502 and the S2D circuit 512. In this way, the outputs of the sense amplifier 502 and S2D circuit 512 do not change (or do not significantly change) in response to voltage fluctuations received at the supply lines 530-532.

Additionally, the ADC 516 reference voltage (e.g., VREF_ADC) may be sampled with respect to the supply line voltage VSS, via sampling capacitor 511, as shown. Sampling the second reference voltage node 542 (e.g., resulting in VREF_sample) ties the second reference voltage VREF_sample to the supply line 532 (VSS), such that the resultant ADC reference is a value approximately equal to VREF_sample−VSS. As such, any bounce, ripple, noise, etc. at the supply line 532 is converted to a simple voltage change (e.g., an increase or decrease in the value of VSS in the previous equation), which allows an accurate reference voltage to be maintained for the ADC 516. In this way, the differential output of the ADC 516 does not change (or changes less than a predefined threshold) in response to voltage fluctuations received at the supply line 532.

As discussed above, in some examples, the chiplet 507 may be one of a plurality of chiplets that can be arranged in an array within the integrated touch screen (e.g., as shown previously in FIG. 4). The plurality of chiplets may be configured to share one or more of the reference voltages (e.g., VCM and VREF_ADC) via shared reference voltage nodes (e.g., 540 and 542). As described above, because the one or more reference voltage nodes are common to the plurality of chiplets, effects of interference events (e.g., noise, bounce, ripple, etc.) may be amplified across one or more chiplets of the plurality of chiplets, increasing crosstalk and thus degrading chiplet performance. The voltage sampling circuitry 502a and 502b outlined above may localize on-chip interference events, such that noise, bounce, ripple, etc. occurring at one chiplet does not interact with and/or affect the performance or operations of another chiplet. For example, after sampling the first and the second reference voltages (e.g., VCM and VREF_ADC) during the analog quiet period, the first and the second switches 520 and 522 may be opened, as discussed above. It is understood that, in such examples, each chiplet of the plurality of chiplets may comprise the voltage sampling circuitry outlined above. The opening of the first and the second switches 520 and 522 effectively breaks the commonality among all the reference voltage nodes shared by the plurality of chiplets. In this way, any noise, bounce, ripple, etc. occurring at one chiplet can be isolated and thus prevented from being transferred to or amplified by another neighboring chiplet. Further, because each chiplet possesses its own low-noise reference voltages (e.g., stored on the sampling capacitors 510A-510C, 511), and because the shared reference voltage nodes are disconnected, each chiplet may perform its own unique operations (e.g., touch sensing, display, etc.) with reduced or without potential interference phenomena, such as crosstalk.

Thus, one advantage of the voltage sampling circuitry is that impacts of interference events external to a chiplet may be minimized or prevented during an operation of the chiplet. Another advantage is that a low-noise steady reference signal may be supplied to one or more electrical components of a chiplet for use in performing a given operation. Another advantage is that sensing information (e.g., touch, ambient light, temperature) may be effectively and reliably captured for the electronic device using the sampled low-noise reference signal. An additional advantage is that the impacts of interference events local to a first chiplet may be minimized or prevented from affecting a second chiplet neighboring the first chiplet. Another advantage of the voltage sampling circuitry is that cross talk among a plurality of chiplets may be reduced by the disconnecting of common reference voltage nodes. An additional advantage is that sensor power supply rejection, power supply rejection temperature, and noise performance of a chiplet may be improved.

Figure 5B:
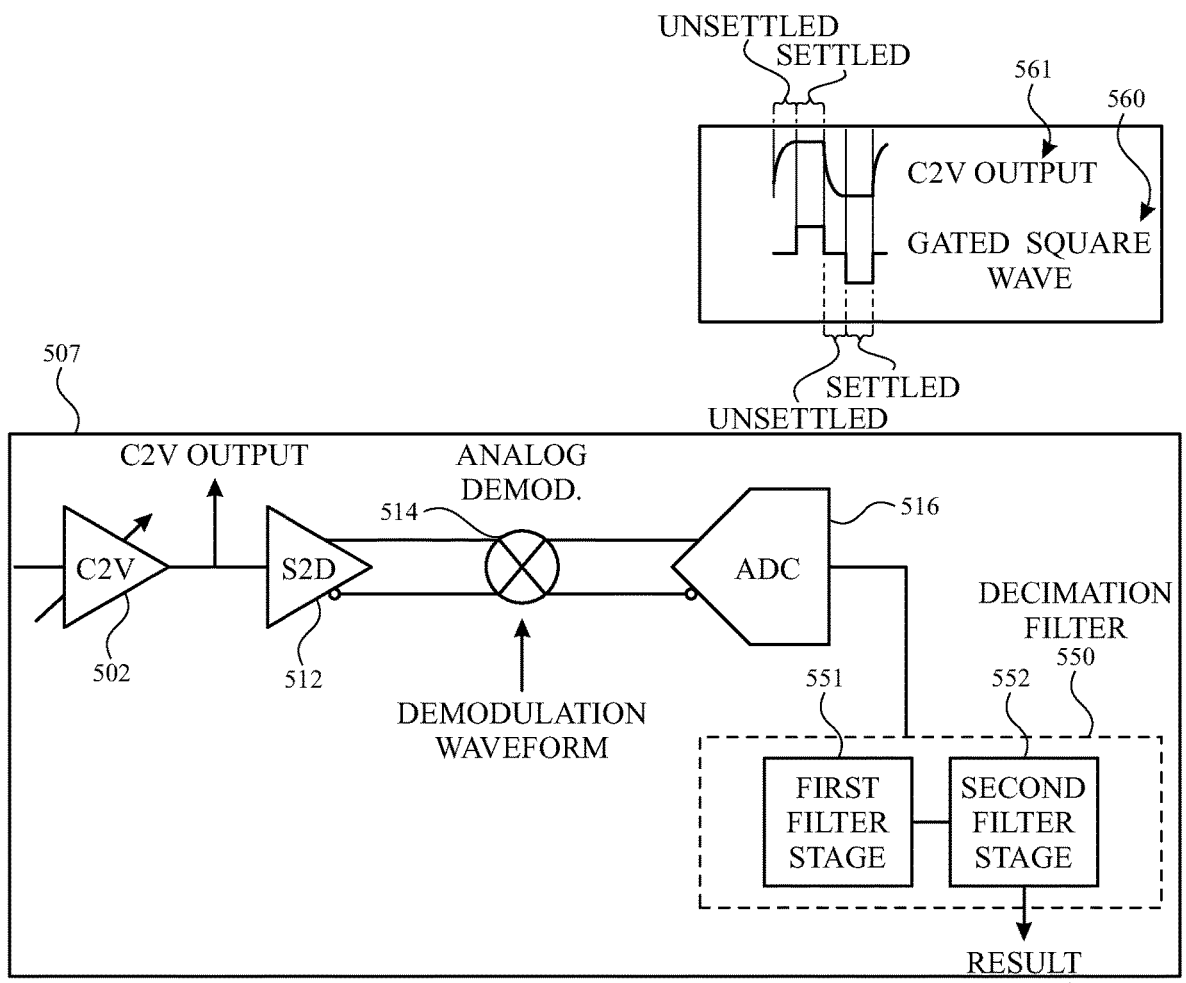

In some examples, thermal drift and/or other noise in measurements by a sense amplifier can be reduced or eliminated using a modified demodulation signal. FIG. 5B illustrates another example of chiplet 507 including sensing circuitry (e.g., corresponding to sensing circuitry 515 in FIG. 5A) and demodulation circuitry for sensing according to examples of the disclosure. It should be understood that, in some examples, chiplet 507 in FIG. 5B may comprise a plurality of the same or similar circuit components shown in FIG. 5A and discussed above. For example, chiplet 507 in FIG. 5B can include a sense amplifier 502 (e.g., corresponding to sense amplifier 502 in FIG. 5A), an S2D circuit 512 (e.g., corresponding to S2D circuit 512 in FIG. 5A), analog demodulator 514 (e.g., corresponding to mixer 514 in FIG. 5A), and ADC 516 (e.g., corresponding to ADC 516 in FIG. 5A). As described herein, in some examples, the demodulation and analog-to-digital conversion can be differential operations as shown. In some examples, the demodulation and analog-to-digital conversion can be single ended (e.g., omitting the S2D circuit 512). In some examples, ADC 516 can be a delta-sigma ADC, optionally implemented with a second order, single-bit cascade of integrators with feed forward (CIFF) architecture.

FIG. 5B also illustrates an example C2V output waveform 561 representing the output of C2V circuit 502. As shown, the C2V output waveform 561 includes a settled period and an unsettled period. For example, during the unsettled period the output of the C2V may be nonlinear as it rises (or falls) to the settled value. As a result, continuous sampling of the output of the C2V circuit 502 may include unsettled touch samples and may represent noise in the touch signal detected by sense amplifier 502 (e.g., in the operating range of 100-400 KHz). In some such examples, the noise present in the C2V output signal 561 may be amplified by the spectral response of the output signal 561. For example, odd harmonics, such as the third harmonic, may be detectable in the spectral response of the output signal 561, which may produce false positive detections of touch.

Accordingly, in some examples, the demodulation signal used for demodulation can be modified (compared with the stimulation signal) to reduce the noise in measurements by the C2V circuit 502. For example, a signal generation circuit (not shown) in the chiplet 507 or in touch and display IC 212 can be configured to generate a demodulation signal for analog demodulator 514. In some examples, the demodulated signal can be modified using variable gating control to reduced noise. For example, FIG. 5B illustrates a gated square wave 560 that zeros out the portions of the C2V output signal 561 corresponding to the unsettled period and passes the portions of the C2V output signal 561 corresponding to the settled period. In contrast, the stimulation applied to the touch electrodes can be a standard square wave (e.g., alternating between a high and a low value). As shown, the gated square wave 560 can effectively exclude touch signal samples from the unsettled portion in C2V output signal 561, thereby, effectively excluding this noise from the resultant touch signal. Excluding samples of the unsettled portion can reduce thermal drift in the touch signal as the samples in the excluded portion are more susceptible to drift than samples in the settled portion.

Additionally or alternatively, in some examples, variable gating control, may adjust the demodulation frequency response of the C2V output signal 561. For example, application of the gated square wave 560 at the analog demodulator 514 may reduce the harmonic response of the demodulation signal. For example, application of the gated square wave 560 having the 33.3% duty cycle may cancel out the third harmonic of the spectral response of the output signal 561, which may effectively reduce or eliminate noise that may have been detected by sense amplifier 502 due to a noise aggressor (e.g., an interference source), at or near the third harmonic (e.g., from AC charging, or other noise sources). Thus, the variable gating control may be used to tune the demodulation signal to achieve the desired suppression of noise from certain frequency bands (e.g., at harmonics of the touch signal), thereby improving touch sensing of chiplet 507. It should be understood that although a 33.3% duty cycle is described above, other suitable duty cycles can be used to achieve the desire spectral response. Additionally or alternatively, as described herein, a decimation filter (e.g., including a finite impulse response filter) can be further used to window the demodulated output, and further suppress frequencies that may include noise (e.g., outside of the frequencies of interest for touch sensing). Alternatively, the window can be applied directly to the analog demodulator 514 to perform the windowing in the analog domain.

Figure 5D:
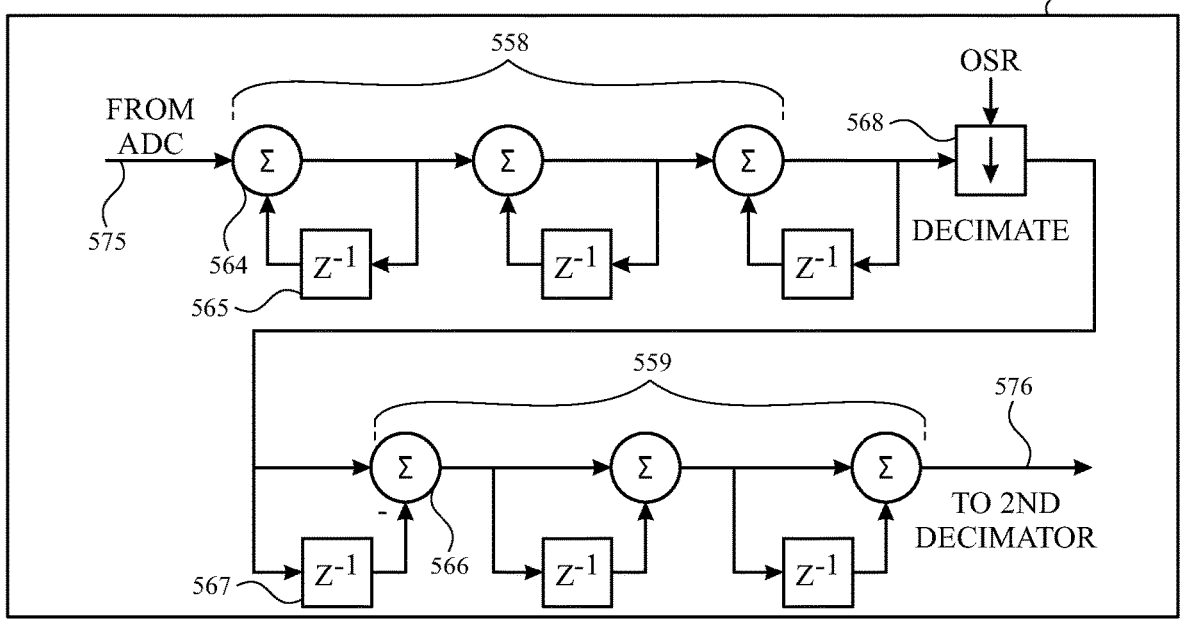
Figure 5C:
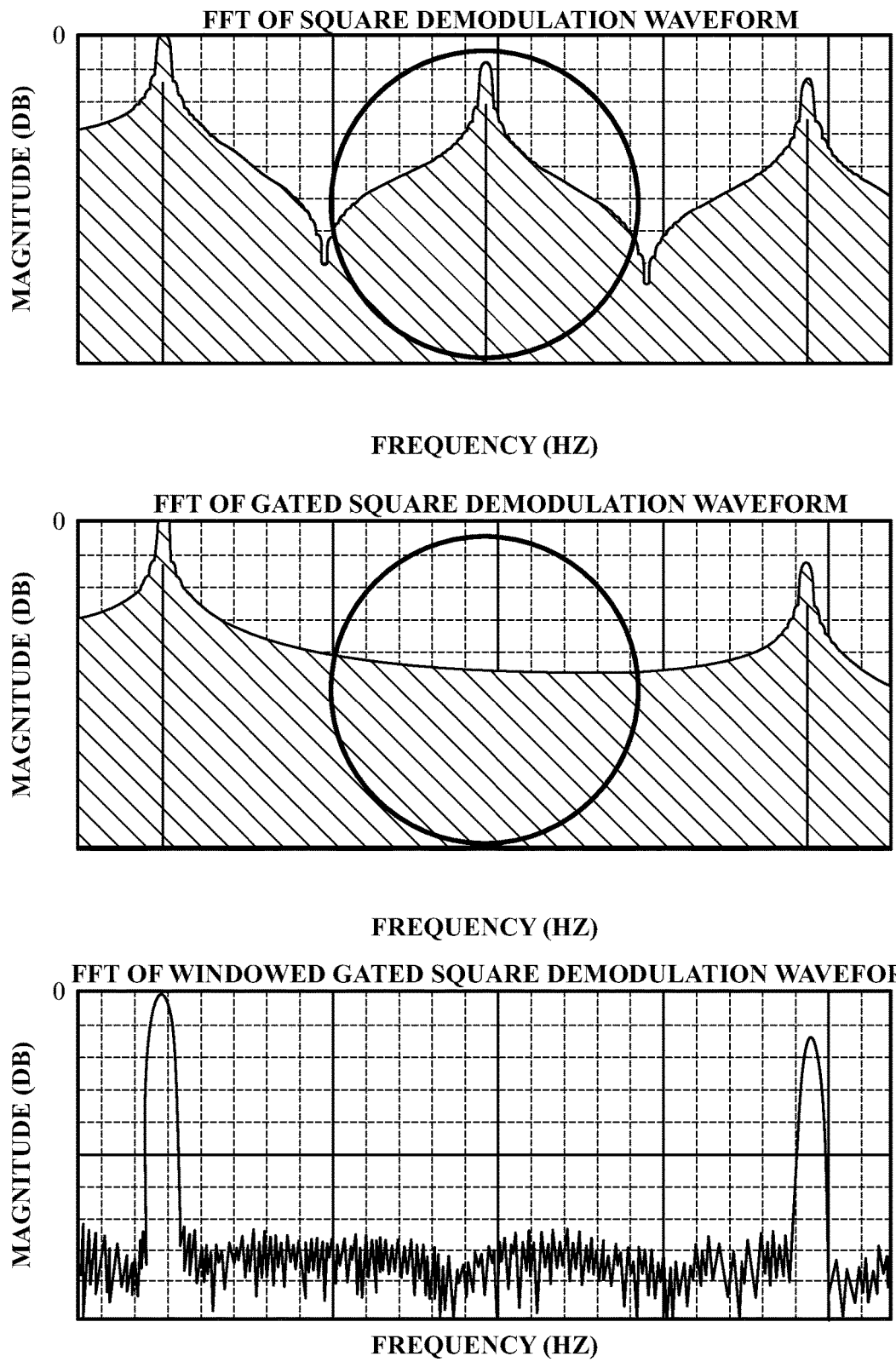

FIG. 5C illustrates example harmonic responses for demodulation using a square wave, a gated square wave using variable gating control, and a windowed, gated square wave according to examples of the disclosure. As shown, for a square demodulation signal without gating and/or windowing, the harmonic response includes odd harmonics. However, with variable gating control, odd harmonics (e.g., the third harmonic) can be suppressed. Furthermore, with windowing, additional frequency content can be suppressed. For example, frequency content at the fundamental (and within a narrow band around the fundamental) can be passed, but content at the second, third and fourth harmonics (and therebetween) can be further suppressed.

Referring back to FIG. 5B, chiplet 507 may further comprise a decimation filter 550 electrically coupled to the output of ADC 516. In some examples, the decimation filter 550 may be configured to filter and downsample the digital output data (e.g., a 4-bit signal, a 6-bit signal, a 12-bit signal, a 16-bit signal, a 32-bit signal, etc.) of the ADC 516 for touch processing, as previously described with reference to FIG. 5A. In some examples, decimation filter 550 may be implemented in two cascaded stages including a first decimation filter 551 and a second decimation filter 552, as shown in FIG. 5B. The output of decimation filter 550 may be electrically coupled to data storage configured to store the output of decimation filter 550 and/or may be transmitted to the touch and display IC 212.

In some examples, the decimation filter 550 may be configurable to operate in one of two modes controlled by the touch and display controller (e.g., corresponding to touch and display IC 212 in FIG. 2 (e.g., specifically by touch circuitry 213)). For example, in a window mode, the decimation filter 550 can be configured to receive the digital output of the ADC 516, where the digital output corresponds to the output of sense amplifier 502 that has been transmitted through the S2D circuit 512 and demodulation circuitry with the analog demodulator enabled. Additionally or alternatively, in a digital demodulation mode, the decimation filter 550 can be configured to receive the digital output of the ADC 516, where the digital output corresponds to the output of sense amplifier 502 that has been transmitted through the S2D circuit 512 and demodulation circuitry with the analog demodulator bypassed. In some examples, decimation filter 550 may include the functionality of an area multiplier (e.g., performing signed binary multiplication). Traditionally, area multipliers may be large, requiring $N^2$ full adders for N number of bits of data, which can occupy significant portions of chip space on an already spatially limited chip. As discussed in detail below, providing decimation filter 550 in two cascaded stages optionally reduces the hardware needed to implement an area multiplier, thereby improving space optimization of chiplet 507.

FIG. 5D illustrates example circuitry of the first decimation filter 551 (e.g., the first stage) of the decimation filter 550 according to examples of the disclosure. As mentioned above, decimation filter 550 of FIG. 5B may be implemented in two cascaded stages.

In some examples, the first decimation filter 551 is optionally a cascaded integrator-comb (CIC) filter implemented in the first stage of decimation filter 550 (e.g., a third order CIC filter). In some examples, first decimation filter 551 may be provided with a configurable decimation rate/factor M (e.g., the ratio of the input rate to the output rate). As shown in FIG. 5D, the first decimation filter 551 comprises one or more integrator and comb filter pairs. For example, as shown, during the integrator stages 558, the digital output 575 of ADC 516 is optionally processed through one or more cascaded integrators, which may utilize one or more addition circuits 564 and one or more delay circuits 565. Following the integrator stages 558, the output of the one or more integrators is optionally fed through a down-sampler 568 which decimates (e.g., down-samples) the result using OSR (over sampling rate) signal and maintains every Mth sample.

As shown in FIG. 5D, following the down-sampler 568, the digital output is optionally passed through one or more comb circuits of comb stages 559 (e.g., equal in number to the one or more integrator stages). In some examples, each of the comb stages 559 can include a subtraction circuit and a delay circuit, such that each comb can subtract a delayed input sample (e.g., at 567) from the current input sample (e.g., at 566). As shown, each output 576 of the comb circuits in comb stages 559, may be sent to the second decimation filter 552, as discussed in detail below.

Figure 5E:
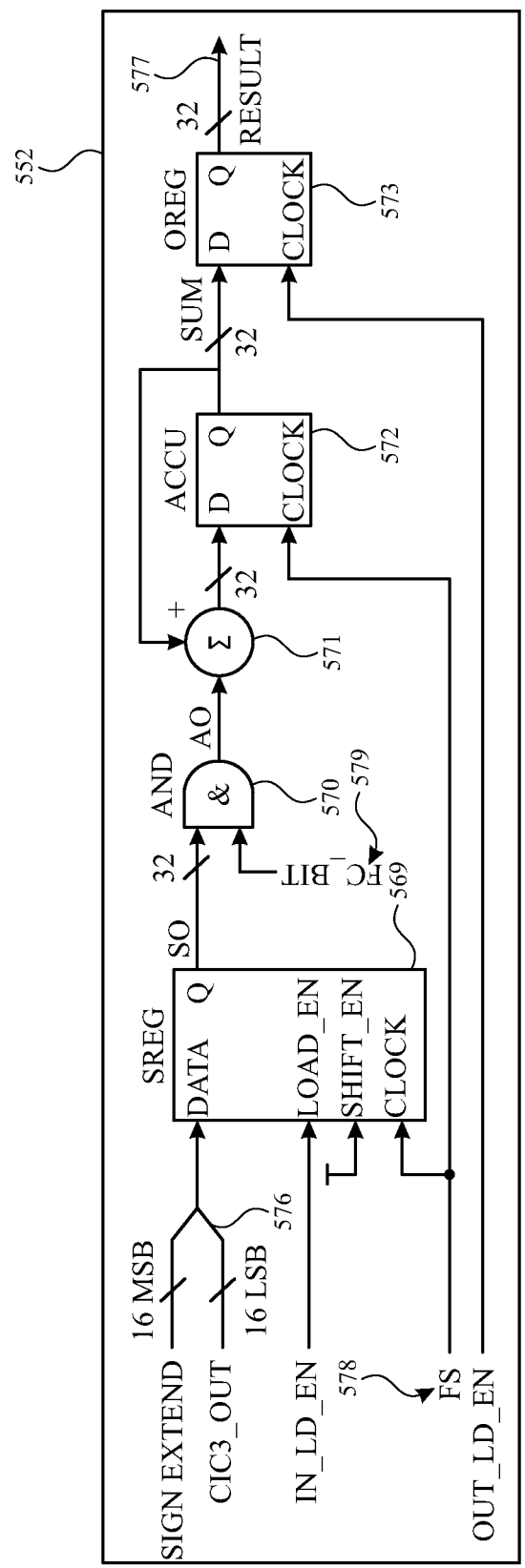

FIG. 5E illustrates example circuitry of the second decimation filter 552 of the decimation filter 550 according to examples of the disclosure. In some examples, the second decimation filter 552 is optionally a cascaded integrator-comb filter (CIC filter), comprising one or more integrator and comb filter pairs as in FIG. 5D, following the first stage. In some examples, the second decimation filter 552 is optionally a finite impulse response filter (FIR filter) (e.g., a second order FIR filter), following the first stage. In some examples, second decimation filter 552 may be provided with a configurable decimation rate/factor M (e.g., the ratio of the input rate to the output rate).

As shown in FIG. 5E, the second decimation filter 552 can perform a multiplication operation with the filter coefficients. However, to reduce the required hardware, partial sums are used to implement the multiplication instead of an area multiplier. In some examples, the second decimation filter 552 can generate a plurality of partial sums corresponding to intermediate results of multiplication between a first number (e.g., an X-bit number) and a second number (e.g., a Y-bit number). In the example of FIGS. 5E, the first number is optionally a 16-bit number and the second number is optionally a 16-bit number, resulting in a 32-bit product. For example, as shown, second decimation filter 552 may comprise a serial shift register (e.g., SREG) 569 configured to receive the output data (labeled CIC3_OUT) 576 from first decimation filter 551 upon receiving a load enable signal (e.g., IN_LD_EN). As described herein, to further reduce the amount and complexity of the hardware for signed binary multiplication, the output of the first decimation filter 551 and the input to the second decimation filter 552 (e.g., in the form of output data 576) can be augmented with sign bits. As shown in FIG. 5E for a 32-bit product (resulting from the 16-bit input and the 16-bit filter coefficients), the 16-bit input to the second decimation filter can be augmented with an additional 16-bits representing the sign value for the input (e.g., 16 additional registers for SREG 569). For example, when CIC3_OUT is a positive number, SIGN EXTEND can be a 16-bit value of "0", whereas when CIC3_OUT is a negative number, SIGN EXTEND can be a 16-bit value of "1". At the shift register 569 input (labeled DATA), the CIC3_OUT data signal 576 may be concatenated with signal SIGN EXTEND to sign extend the CIC3_OUT data signal 576 to be 32-bits wide (e.g., as indicated by the 32-bit output of shift register 569), such that CIC3_OUT forms the 16 least significant bits (LSB) of the output signal SO and SIGN EXTEND forms the 16 most significant bits (MSB) of the output signal SO. In some examples, shift register 569 may store the concatenation of the output received from first decimator 551 and extended sign bits SIGN EXTEND. In some examples, upon each falling edge of clock signal 578 (e.g., FS), shift register 569 may shift the SREG contents (e.g., the concatenation) stored in shift register 569 by 1 bit from the LSB position to the MSB position per cycle of clock signal 578. In some examples, after the shift by shift register 569, the LSB position of the contents of shift register 569 includes a value of zero.

As shown in FIG. 5E, second decimation filter 552 is provided with gating functionality via AND gate 570. For example, AND gate 570 may perform an AND operation between an output of shift register 569 and a filter coefficient bit 579 (e.g., FC_BIT). In some examples, filter coefficient bit 579 can be supplied from the host device (e.g., supplied serially by host processor 220 or touch and display IC 212 in FIG. 2), which thereby can diminish the need for local storage in second decimation filter 552 (and potentially further reduces space constrains for the chiplet by reducing memory requirements). In some examples, the filter coefficient bits 579 can be locally stored in the chiplet. In some examples, when the corresponding filter coefficient bit 579 (e.g., FC_BIT) is set high (e.g., resulting in an AND operation with "1" at AND gate 570), each partial sum of the product of the output of SREG 569 and a filter coefficient bit can be accumulated by addition circuits 571 and accumulator circuit 572, until the partial sums are all added together for each of the filter coefficient bits (e.g., 16 partial sums). The final accumulated sum (e.g., SUM) may be stored in output register 573, which optionally sends the now filtered output data 577 (e.g., RESULT) to data storage on the chiplet or to the touch and display IC 212.

The filtered data stored by the chiplet and/or send to the touch and display IC 212 can be processed (e.g., by one or more touch processors, discrete logic network, hardware accelerator, etc.) to determine a touch or proximity event (e.g., at the touch node corresponding to the chiplet). Thus, as outlined above, decimation filter 550, implemented in two cascaded stages comprising first decimation filter 551 and second decimation filter 552, enable efficient filtering and downsampling of digital sense data for determining the presence of touch. The first decimation stage (e.g., with a decimation ratio M) can provide M clock cycles available for a multiplication operation in the second decimation stage. When M is equivalent to the number of multiplier bits, then the area multiplier can be replaced with a more economical shift and add multiplier (which requires M clocks) and the coefficients of the filter can be serialized into a stream of M bit as described herein. Thus, as discussed above, providing decimation filter 550 as a cascade of the first decimation filter 551 and second decimation filter 552 simplifies the overall multiplier architecture by replacing a conventional area multiplier architecture with a more economical shift and add multiplier, thereby reducing the required area for implementing the decimator on chiplet 507 (e.g., using N adders circuits instead of $N^2$ adder circuits). Additionally, for the signed binary multiplication discussed above and shown in FIGS. 5D-5E, sign extending the input signal (e.g., the 16-bit CIC3_OUT signal) to the shift register 569 can reduce the complexity of the logic circuitry required for signed multiplication. For example, extending the output of the shift register 569 to the overall product bit width (e.g., 32 bits) provides for the sign to be stored and tracked during the accumulation stages (e.g., when adding the intermediate results at addition circuit 571 and accumulator 572) rather than having to use downstream logic to track and account for the sign of each partial sum.

Figure 5F:
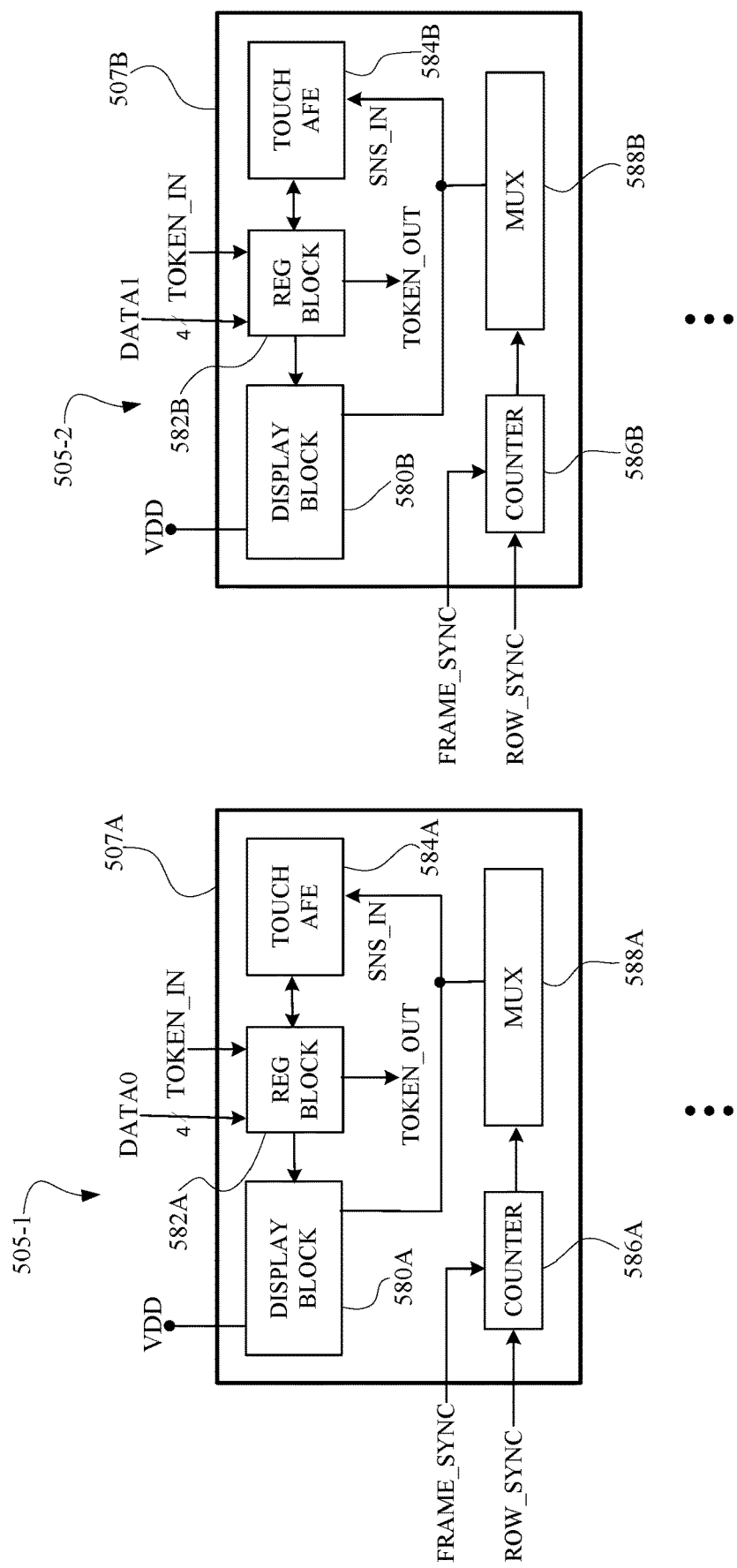
FIG. 5F illustrates example circuitry of an array of chiplets that include display circuitry, sampling circuitry, and sensing circuitry of an integrated touch screen according to examples of the disclosure.

Although not shown in FIG. 5A-5E, in some examples, a chiplet can optionally include display circuitry in addition to sampling and sensing circuitry. In some such examples, some signal lines can be shared for touch sensing and display operations. FIG. 5F illustrates example circuitry of an array of chiplets that include display circuitry, sampling circuitry, and sensing circuitry of an integrated touch screen according to examples of the disclosure. As discussed above, an integrated touch screen of an electronic device may be implemented as a material stack up (e.g., corresponding to stack ups 300 and 320 in FIGS. 3A-3B) including chiplets (or touch chiplets and display chiplets). As shown in FIG. 5F, the chiplets may be arranged as an array (e.g., a row/column array with a first number of chiplets arranged within a column and a second number of chiplets arranged within a row) above or below the touch screen substrate (e.g., in touch and display circuit layer 308 or 311 above or below substrate 310), as similarly discussed above with reference to FIG. 4. As shown in FIG. 5F, the array may include a first column 505-1 of chiplets and an adjacent second column 505-2 of chiplets. In some examples, the first column 505-1 includes a first chiplet 507A and the second column 505-2 includes a second chiplet 507B, where the first chiplet 507A is adjacent to the second chiplet 507B (e.g., the first chiplet 507A and the second chiplet 507B are arranged in the same row of the array). It should be understood that the chiplets in the first column 505-1 and the chiplets in the second column 505-2 are illustrated and described herein with reference to the first chiplet 507A and the second chiplet 507B, respectively.

In some examples, as shown in FIG. 5F, the first chiplet 507A and the second chiplet 507B may comprise a plurality of exemplary components, which is optionally the same between the two chiplets 507A and 507B (and optionally thus between adjacent chiplets in the first column 505-1 and the second column 505-2). As shown in FIG. 5F, the first chiplet 507A and the second chiplet 507B may include display circuitry, represented by display block 580A/580B. In some examples, the display circuitry of the display block 580A/580B may correspond to display circuitry discussed previously above (e.g., display circuitry 211 in FIG. 2A). In some examples, as shown in FIG. 5F, the first chiplet 507A and the second chiplet 507B may further include input memory, represented by register (reg) block 582A/582B. As discussed in more detail below, the register block 582A/582B may be configured to receive data (e.g., four-bit data) as input to the chiplet 507A/507B. As shown in FIG. 5F, the first chiplet 507A and the second chiplet 507B may also include touch sensing circuitry, represented by touch analog-front-end 584A/584B. In some examples, the touch sensing circuitry of the touch AFE 584A/584B may correspond to touch sensing circuitry discussed previously above (e.g., touch sensing circuitry 415 in FIG. 4 and/or touch sensing circuitry 515 in FIG. 5A).

Additionally, in some examples, the first chiplet 507A and the second chiplet 507B may comprise a plurality of timing components, which is optionally the same between the two chiplets 507A and 507B (and optionally thus between adjacent chiplets in the first column 505-1 and the second column 505-2). As shown in FIG. 5F, the first chiplet 507A and the second chiplet 507B may include a counter 586A/586B, which may be configurable to receive one or more timing (e.g., clock) signals, as discussed in more detail below. In some examples, as shown in FIG. 5F, the first chiplet 507A and the second chiplet 507B may also include switching circuitry, such as a multiplexer (MUX) 588A and 588B that is configurable to multiplex connections between the display circuitry and the cathode electrodes of the integrated touch sensor panel according to timing signals received from the counter 586A/586B to update the display. Additionally, the switching circuitry can be used to couple the cathode electrodes of the integrate touch sensor panel together and to the touch sensing circuitry for touch sensing operations. As shown in FIG. 5F, the first chiplets 507A and the second chiplet 507B may be configured to receive one or more supply voltages for powering an operation (e.g., display operation, touch sensing operations) of each of the chiplets 507A/507B. In some examples, as similarly discussed above, the one or more voltage supplies powering voltage supply line VDD may be generated in the power management unit (e.g., PMU 214 in FIG. 2A). For example, a voltage supply line may provide voltage signal VDD to each chiplet 507A/507B.

As discussed above with reference to FIG. 5A, the touch sensing circuitry (and/or display circuitry) may be susceptible to interference events (e.g., electromagnetic interference) occurring internally or externally to the device. For example, as discussed above, interference events can include supply and/or ground voltage noise (e.g., from the supply lines VDD1, VDD2 and/or VSS), ripple or bounce from power management unit (e.g., PMU 214), off-chip analog buffer, micro-driver on-chip supply current noise/bounce (i.e., chiplet supply current noise/bounce), backplane noise/interferer coupling at the sense amplifier input (e.g., at the non-inverting input of the sense amplifier 250), among other possibilities. Further, as shown in FIG. 5F, for example, because the plurality of chiplets share the same voltage supply network (VDD), individual operations/actions performed by individual chiplets (e.g., 507A/507B), as well as localized noise, bounces, etc. on the individual chiplets, can affect other neighboring chiplets through crosstalk. As the crosstalk is increased among the plurality of chiplets, the performance of one, some, or all chiplets can be degraded. As discussed below, configuring the chiplets in the adjacent columns 505-1 and 505-2 to share data lines and/or one or more clock signals can reduce or eliminate (and/or otherwise prevent) the above-described impacts of electromagnetic interference events on chiplet sensing performance.

In some examples, as mentioned above, the first chiplet 507A and the second chiplet 507B may be configurable to receive a data signal (e.g., a four-bit data signal) as input. In some examples, the data signal may comprise one or more data lines, which optionally correspond to the display data lines (e.g., for controlling the image to display of the electronic device). In some examples, the data lines may be shared to control both touch and display operations. In some examples, same data lines may be used to supply the display data signal (DATA0) to the first chiplet 507A for display operation and the touch data signals to the first chiplet 507A for touch sensing operations. The touch data signals can include configuration information for touch sensing, timing information for touch sensing, and outputting data from touch sensing (e.g., to a host processor). In a similar manner, the data lines may be shared to control both touch and display operations for the second chiplet 507B (e.g., DATA 1). In some examples, to reduce the number of data lines, each column of chiplets shares the same data lines. For example, in FIG. 5F, the same data lines may be used to supply the first column of chiplets, including first chiplet 507A, with the four-bit data signal DATA0, and the same data lines may be used to supply the second column of chiplets, including the second chiplet 507A, with the four-bit data signal DATA1. Additionally, as shown in FIG. 5F, the first chiplet 507A and the second chiplet 507B may be configurable to receive a second input signal TOKEN_IN. The TOKEN_IN signal can be provided to select which chiplet within the column of chiplets is active to use the data lines for touch or display purposes. For example, during a display operation, only a chiplet (or multiple chiplets) within the column of chiplets (e.g., the one(s) with the active token) reads the display data lines to update the appropriate portion of the display in accordance with the display data. Likewise, during a touch sensing operation, only the chiplet (or multiple chiplets) within the column of chiplets (e.g., the one(s) with the active token) reads the configuration or timing information for touch sensing from the data lines or outputs sensed touch data to the data lines. In some examples, as discussed below, the data lines may be configured in a differential fashion (e.g., in which the data signals DATA0 and DATA1 include opposite polarities) to help reduce and/or remove (and prevent) interference events.

In some examples, the data lines of the data signal received by the chiplets of FIG. 5F may be provided in one or more exemplary configurations. In some examples, the data lines supplying the chiplets 507A and 507B with the data signal may be configured with a single ended configuration. In some examples, when employing the single ended configuration, all data lines for a given data signal may have the same polarity. For example, in FIG. 5F, the data lines for DATA0 and DATA1 may be positive, such that the polarities for DATA0 are {1, 1, 1, 1} (e.g., for a four-bit signal) and the polarities for DATA1 are also {1, 1, 1, 1}. Alternatively, in some examples, when employing the single ended configuration, the data lines for DATA0 and DATA1 may be inverted, such that the polarities for DATA0 and DATA1 are both {0, 0, 0, 0} (e.g., for a four-bit signal). In some examples, utilizing the single ended configuration may allow for fewer interface lines and lower power usage (e.g., because each line carries an independent signal). In some examples, the data lines supplying the chiplets 507A and 507B with the data signal may be configured with a fully differential configuration (e.g., locally differential within a column). In some examples, when employing the fully differential configuration, a given pair of data lines of the data signal may have opposite polarities. For example, in FIG. 5F, each pair of the data lines for DATA0 and DATA1 may have opposite polarities, such that the polarities for DATA0 are {0, 1, 0, 1} (e.g., for a four-bit signal) (or {1, 0, 1, 0}) and the polarities for DATA1 are also {0, 1, 0, 1} (or {1, 0, 1, 0}). In some examples, utilizing the fully differential configuration may allow for improved local electromagnetic interference control (e.g., on a given chiplet and/or for a given column of chiplets). In some examples, the data lines supplying the chiplets 507A and 507B may be configured with a column differential configuration. In some examples, when employing the column differential configuration, the data lines of the data signal for one column of chiplets have the same polarity and the data lines of the data signal for an adjacent column of chiplets have the same but opposite polarity of the data lines for the first column of chiplets. For example, in FIG. 5F, the data lines for DATA0 may be positive, such that the polarities for DATA0 are {1, 1, 1, 1} (e.g., for a four-bit signal), and the data lines for DATA1 may be inverted, such that the polarities for DATA1 are {0, 0, 0, 0}. Alternatively, in some examples, when employing the column differential configuration, the polarities of the data lines for DATA0 may be {0, 0, 0, 0} and the polarities for DATA1 may be {1, 1, 1, 1}.

Accordingly, the data signal (e.g., DATA0/DATA1) supplied to the chiplets 507A and 507B within the chiplet array (e.g., columns 505-1 and 505-2) may be provided using one of the above configurations to help reduce (and/or prevent) electromagnetic interference (and other interference events) between the adjacent chiplets 507A and 507B. As shown in FIG. 5F, the respective data signal DATA0/DATA1 may be received by the respective register block 582A/582B of the respective chiplet 507A/507B. It should be understood that, although the data signals DATA0 and DATA1 are described herein as being four-bit signals, other bit lengths are possible, such as 2-bit, 6-bit, 8-bit, 10-bit, odd-bit, etc. signals. In some examples, the first chiplet 507A and the second chiplet 507B may receive the data signals DATA0 and DATA1, respectively, concurrently or sequentially. In some examples, as described below, the register block 582A/582B of the chiplet 507A/507B may transmit (e.g., via electrical traces) the data received to the touch sensing circuitry (e.g., included in Touch AFE 584A/584B) and/or the display circuitry (e.g., included in display block 580A/580B) according to one or more clock cycles (e.g., dictated by one or more clock signals).

In some examples, as mentioned above, the first chiplet 507A and the second chiplet 507B may be configurable to share one or more timing (e.g., clock) signals shared between the touch sensing circuitry (e.g., Touch AFE 584A/584B) and the display circuitry (e.g., display block 580A/580B). For example, as shown in FIG. 5F, the counter 586A/586B may be configured to receive a first clock signal FRAME_SYNC and a second clock signal ROW_SYNC. In some examples, the first clock signal FRAME_SYNC and the second clock signal ROW_SYNC may control a cycle in which display operations and/or touch operations are performed at the electronic device (e.g., using the first chiplet 507A and the second chiplet 507B). In some examples, the first and the second clock signals may be utilized to control timing of the touch sensing circuitry (e.g., Touch AFE 584A/584B) of the chiplets 507A and 507B. For example, the FRAME_SYNC and ROW_SYNC clock signals may be utilized to synchronize transmission of the data signal (e.g., DATA0 and DATA1) from the register block 582A/582B to the display block 580A/580B and/or the Touch AFE 584A/584B (e.g., via signal SNS_IN controllable by the MUX 588A/588B) on the chiplet 507A/507B. In some examples, the data signals DATA0 and DATA1 may be used for touch configuration, touch timing, and/or touch readout, as well as display operations, as discussed previously above. Accordingly, as described above with reference to FIG. 5F, the chiplets in the first column 505-1 and the second column 505-2 are optionally configurable to utilize the display data lines to supply touch data (e.g., via DATA0 and DATA1) to the touch sensing circuitry (e.g., included in the Touch AFE 584A/584B) of the chiplets, which provides for improved electromagnetic interference control, thereby improving device operation, as an advantage.

It should be understood that the various circuit components shown in FIGS. 5A-5F and discussed above are exemplary and that additional or alternative circuit components may be employed on the chiplet 507. For example, operational amplifier 502 can include an input resistor in its feedback network in addition to or instead of capacitor 503. Additionally or alternatively, a fewer or greater number of voltage sampling circuit components (e.g., switches and sampling capacitors) may be provided to correspondingly provide a fewer or greater number of reference voltages to the circuit components of the chiplet. For example, a voltage sampling circuit may be included for VREF_ADC and not for VCM (or vice versa). Additionally or alternatively, additional voltage sampling circuitry can be provided for additional reference voltages. Accordingly, the voltage sampling circuitry may be provided to provide low-noise reference voltages effectively and efficiently to the alternatively configured amplifier circuitry.

Figure 6:
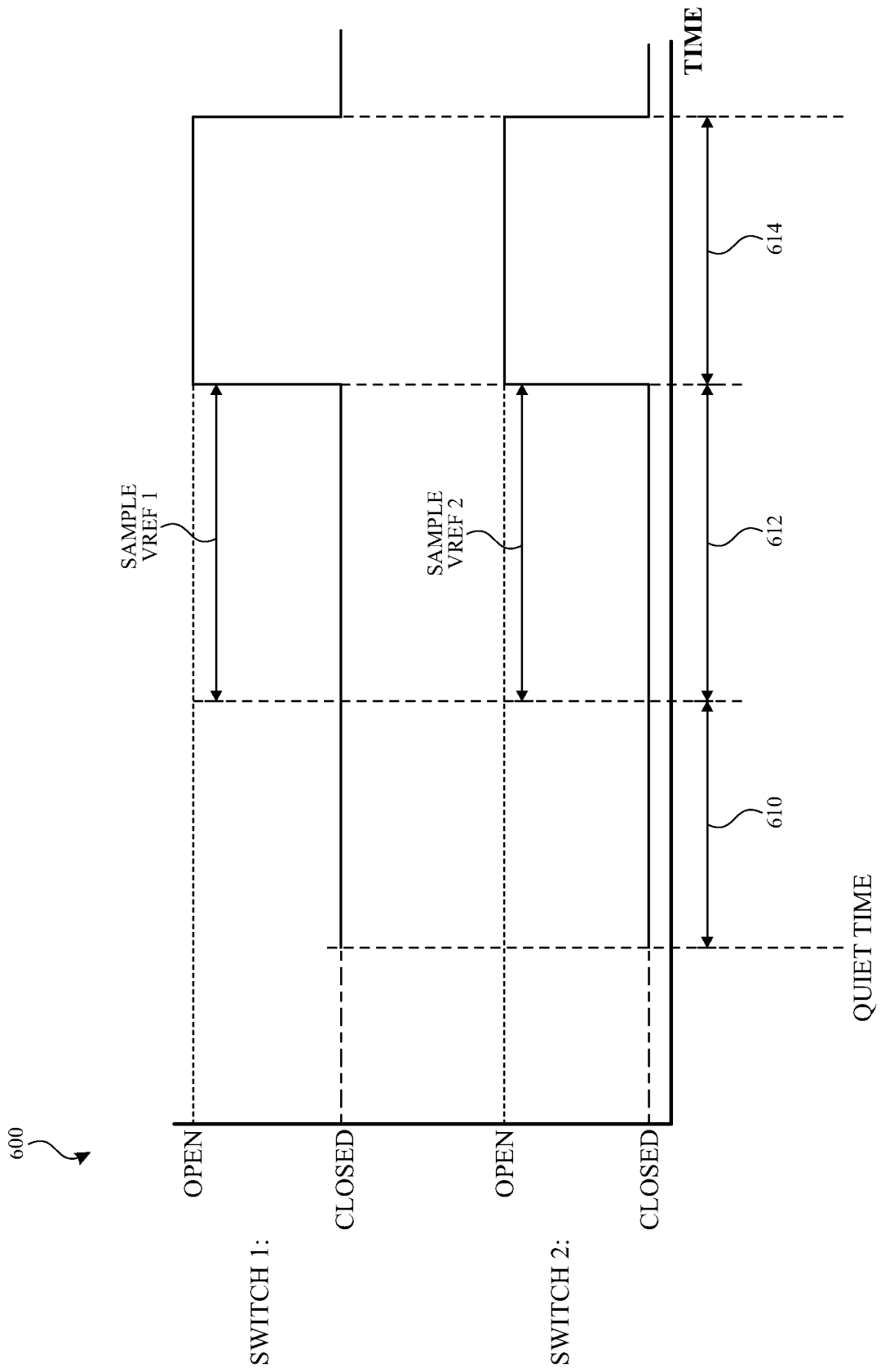
FIG. 6 illustrates an example timing diagram for operating switches according to examples of the disclosure.

FIG. 6 illustrates an example timing diagram of operating switches for sampling operations according to examples of the disclosure. It should be understood that the timing diagram is exemplary and different timing can be employed. FIG. 6 illustrates a timing diagram 600 that can include periods (e.g., periods 610, 612, 614) corresponding to sampling operations and/or operations using sampled reference voltages. For example, as described herein, sampling operations by voltage sampling circuitry can including sampling external references to provide low-noise references to the chiplets, etc. for touch sensing operations. As shown, the timing diagram 600 separately illustrates the switch positions for performing sampling operations for multiple reference voltages. For example, one sampling operation can provide a reference voltage (e.g., Vref 1) to the sense amplifier (e.g., 502) and S2D circuitry (e.g., 512) and a second sampling operation can provide a reference voltage (e.g., Vref 2) to the ADC (e.g., 516). As discussed above, the sampling operations can be performed prior to touch operations or other sensing operations (e.g., temperature sensing, display, etc.) that use the low noise sampled reference voltage.

In some examples, period 612 can be a sampling period during which the one or more references can be sampled while the switches remain closed (e.g., coupling the sampling capacitors to the reference voltage nodes of the chiplets) and period 614 can be a sensing period during which the one or more references can be used for the sensing operations. In some examples, the sampling period can optionally be preceded by a period 610 in which the sampling corresponds to preparation for sampling in which the switch may be closed. In some examples, period 614 can include a touch sensing operation. In some examples, period 614 can include additional operations supporting the touch sensing operation. As an example, the chiplet can be configured for sensing operations before the sensing operation, the sensing operation(s) can be performed by the chiplet, and/or the sensing data can be read out from the chiplet after the sensing operation. In some examples, the configuration, performance and/or data readout can occur in a different order. The sensing operations can include a mutual capacitance scan, a self-capacitance scan, a stylus scan, touch spectral analysis scan, and a stylus spectral analysis scan, among other possible sensing operations. In some examples, multiple sensing operations can be performed in parallel. For example, as described herein, touch operations can be performed in parallel (e.g., across multiple chiplets). In some examples, spectral analysis for a clean stylus frequency can be performed during a touch sensing operation and/or a spectral analysis for a clean touch frequency can be performed during a stylus sensing operation.

As shown in FIG. 6, the sampling operations can include operating the first switch (e.g., corresponding to first switch 520, "S0" in FIG. 5A), labeled "Switch 1", and operating the second switch (e.g., corresponding to second switch 522, "S0" in FIG. 5A), labeled "Switch 2". As discussed herein, the sampling operations can include sampling a first reference voltage node (e.g., corresponding to voltage node 540) and sampling a second reference voltage node (e.g., corresponding to voltage node 542). In some examples, the sampling operations are optionally performed before the touch sensing operation.

In some examples, the chiplet (e.g., touch chiplet and/or display chiplet) can idle after performing an operation, during which period the chiplet is not being configured, performing a sensing operation, and/or performing a data read out. In such examples, the idling period may define and/or cause the chiplet to enter a quiet period during which the one or more sampling operations are performed during periods 610 and/or 612. In some such examples, after the quiet time 620 begins, the first and the second switches (Switch1 and Swtich2) can be closed (if not already closed), as shown at the start of period 610. Then, in some such examples, after the first and the second switches have been closed, the one or more reference voltage nodes can be sampled to obtain one or more reference voltages (Vref 1 and Vref 2) stored in the sampling capacitors (e.g., corresponding to capacitors 510A-511), as shown in period 612. Then, the first and the second switches (Switch1 and Switch2) can be opened to disconnect the one or more reference voltage nodes from the sampling capacitors, for example, as shown by the transition in the state of the switches at the start of period 614. As discussed herein, the sensing operations following the sampling operations can utilize the one or more low-noise reference voltages obtained during the sampling period.

It is understood that, in some examples, the sampling operations performed during each period for each reference voltage can be performed concurrently. Additionally or alternatively, in some examples, the sampling operations for different reference voltages may not be performed concurrently. For example, the first switch (Switch 1) may be operated to sample the first reference voltage node (e.g., corresponding to node 540) during a first period and the second switch (Switch 2) may be operated to sample the second reference voltage node (e.g., corresponding to node 542) during a second period, different from the first period. For example, during a first sequence of sampling periods, the sampling operations may be performed to provide reference voltages to the sense amplifier circuitry (e.g., corresponding to sense amplifier (C2V) 502 and S2D 512), and during a second sequence of sampling periods, the sampling operations may be performed to provide reference voltages to the ADC circuitry (e.g., corresponding to buffer 506 and ADC 516). Additionally or alternatively, the sampling operations may be performed during a first sequence of sampling periods for a first chiplet, and then may be performed during a second sequence of sampling periods for a second chiplet, for example.

Time-multiplexing sampling and sensing functionality can be beneficial to avoid interference between sampling and sensing operations. In particular, transients due to micro-driver currents used to drive voltage sampling circuitry and touch sensing circuitry of the chiplets can introduce noise into touch measurements that can reduce sensing performance if sampling and sensing operations occurred concurrently.

Figure 7:
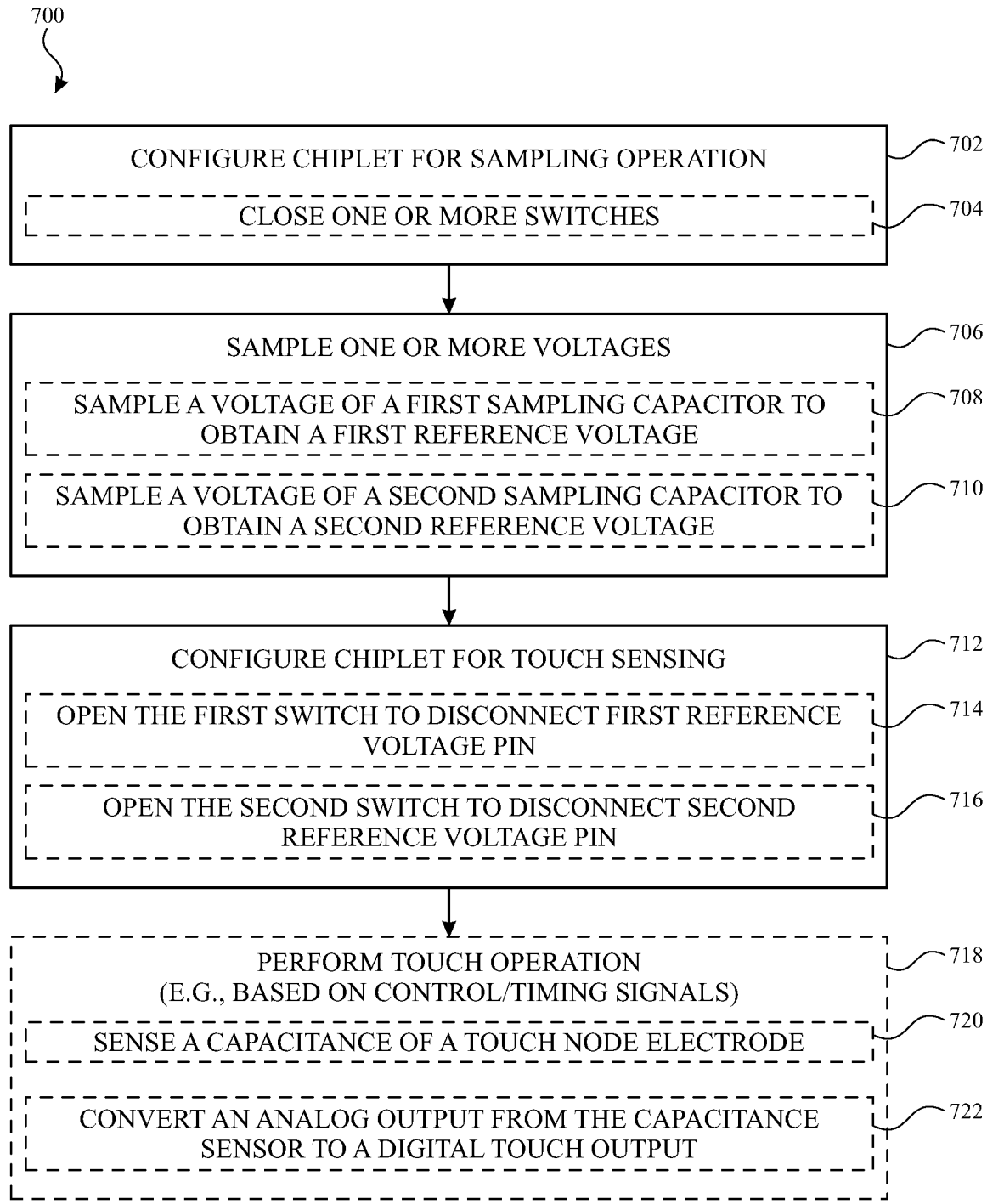
FIG. 7 illustrates an example process of sampling one or more reference voltages for operating an integrated touch screen according to examples of the disclosure.

FIG. 7 illustrates an example process 700 of sampling one or more reference voltages for operating an integrated touch screen according to examples of the disclosure. As described herein, the integrated touch screen can include display operation and touch operation. For example, touch operations can occur during intraframe pauses or interframe pauses in the display operations. The touch operations may be preceded by a voltage sampling operation for providing one or more reference voltages for use in such touch sensing operations. In some examples, the sampling occurs before each touch sensing operation. In some examples, the sampling occurs periodically, such as every minute, every half minute, every two minutes, etc. In some examples, the sampling occurs in response to detecting that noise levels are above a predefined threshold (e.g., noise, ripple, bounce, etc. on one or more chiplets exceeds the predefined threshold) or some other trigger. In some examples, the sampling occurs a predefined number of times before an operation is performed, such as one, two, three, four, etc. times before each touch sensing operation. As discussed herein, the sampling operation can be performed by voltage sampling circuitry.

At 702, the chiplet may be configured to perform a sampling operation. For example, while the device is in an analog quiet period (e.g., a period of low or idle chiplet (touch chiplet and/or display chiplet) activity). In some examples, the one or more switches of the sampling circuitry can be closed (or remain closed) to allow one or more reference voltages to be sampled by one or more sampling capacitors for later use in one or more sensing operations (704). For example, switch 520 and/or switch 522 can be closed. At 706, the sampling operation can include sampling one or more voltages. In some examples, the sampling operation can include sampling a first voltage reference node using a first sampling capacitor to obtain a first reference voltage (708), such as the ADC reference voltage sampled on sampling capacitor 511. In some examples, the sampling operation can include sampling a second voltage reference node using one or more second sampling capacitors to obtain a second reference voltage (710), such as sampling the common mode reference voltage on sampling capacitors 510A-510C. It is understood that the sampling operation can include sampling more or fewer reference voltage nodes depending on the number of reference nodes in a given application.

At 712, after sampling the one or more reference voltages, the one or more switches can be opened to disconnect the input voltage pins (e.g., the chiplet reference voltage pins) from the sampling capacitors (e.g., the first input voltage pin and the second input voltage pin can be decoupled from the first sampling capacitor and the second sampling capacitor by opening the respective switches (714, 716)). The sampled reference voltages can be stored across the sampling capacitor(s) and can represent low-noise references because the references are decoupled from the reference voltage pin external to the chiplets. Opening the one or more switches can occur at the conclusion of a sampling operation and/or as part of configuring the chiplet for touch sensing operation after the sampling operation.

Additionally, as described herein, the first reference voltage and/or the second reference voltage stored across the first and second sampling capacitors, respectively, can be used to perform one or more sensing operations (e.g., touch sensing). Sensing circuitry can perform the one or more sensing operations (e.g., be configured to perform a specific type of touch scan). For example, the sensing circuitry can be configured to drive (D), sense (S) and/or ground (G) a touch node electrode and to operate in self-capacitance and/or mutual capacitance configurations. At 718, the integrated touch screen can perform touch operations (e.g., based on timing and/or control signals from the touch and display controller 212). For example, the touch operation can include sensing a capacitance of a touch node electrode (720), where the sense amplifier can be referenced to the reference voltage of a sampling capacitor (e.g., capacitors 510A-510C). In some examples, an analog measurement by the sensing circuitry can be converted to a digital value by an ADC reference to the reference voltage of a sampling capacitor (e.g., capacitor 511) and output by the chiplet or touch chiplet (722).

Additionally, as described herein (e.g., with reference to FIGS. 2B and 2C), the touch screen can operate in a power domain referenced to a guard voltage during touch operation (e.g., a guarded self-capacitance touch scan). A guard voltage can be generated (e.g., by a guard integrated circuit). A guard layer can be driven by the guard voltage and the supply voltages (e.g., for chiplets or touch chiplets) can be referenced to the guard voltage.

While described herein as being applied to chiplets (e.g., touch chiplets and display chiplets), the disclosed voltage sampling architecture and method may be applied generally to any chiplet-based system or to any system that may require or benefit from a low-noise reference voltage for performing a given operation (e.g., any system that uses digital-to-analog converters). For example, as discussed herein, the disclosed voltage sampling method may be used for providing one or more low-noise reference voltages to a display system for updating one or more pixels of a display. As another example, the disclosed voltage sampling method may be used for providing one or more low-noise reference voltages to a temperature sensing system for reading and/or detecting a temperature internally or externally to an electronic device, and for performing a particular operation using the detected temperature reading. As another example, the disclosed voltage sampling method may be used for providing one or more low-noise reference voltages to an optical system for selectively emitting light from one or more light emitters within the optical system. As another example, the disclosed voltage sampling method may be used for providing one or more low-noise reference voltages to a communications system for wireless communications (e.g., referencing a receiver circuit in a transmitter to receiver system). It is understood that the disclosed voltage sampling architecture and method may be applied to various other systems for providing efficient and reliable voltage references for performing various operations not explicitly mentioned herein. Therefore, according to the above, some examples of the disclosure are directed to a chiplet for an electronic device having an integrated touch screen. The chiplet can comprise sampling circuitry including a first sampling capacitor and a first switch electrically coupled to a first input of a first amplifier, the first sampling capacitor electrically coupled to a first input voltage pin via the first switch. Additionally or alternatively, in some examples, the sampling circuitry can be configured to: during an analog quiet period and with the first switch closed, sample a voltage of the first sampling capacitor to obtain a first reference voltage; and after obtaining the first reference voltage, open the first switch to disconnect the first input voltage pin from the first sampling capacitor.

Additionally or alternatively, in some examples, the first amplifier is configured with a feedback path that includes a feedback impedance between a second input of the first amplifier and an output of the first amplifier.

Additionally or alternatively, in some examples, the integrated touch screen of the electronic device comprises a plurality of micro light emitting diodes (micro-LEDs) and a plurality of electrodes coupled to cathode terminals of the plurality of micro-LEDs.

Additionally or alternatively, in some examples, the chiplet can further comprise a mixer coupled to the output of the first amplifier.

Additionally or alternatively, in some examples, the sampling circuitry is configured to be coupled to the plurality of micro-LEDs and the plurality of electrodes. Additionally or alternatively, in some examples, the sampling circuitry can be further configured to during an active period and with the first switch opened, operate the first amplifier using the first reference voltage stored in the first sampling capacitor. Additionally or alternatively, in some examples, operating the first amplifier includes measuring a capacitance of the plurality of electrodes coupled to the first amplifier. Additionally or alternatively, in some examples, the sampling circuitry can be further configured to operate the mixer to demodulate the output of the first amplifier with a demodulation signal.

Additionally or alternatively, in some examples, the mixer is a differential mixer. Additionally or alternatively, in some examples, the chiplet can further comprise a single-ended-to-differential conversion circuit. Additionally or alternatively, in some examples, the output of the first amplifier is coupled to a first input of the single-ended-to-differential conversion circuit, and differential outputs of the single-ended-to-differential conversion circuit are coupled to differential inputs of the differential mixer.

Additionally or alternatively, in some examples, the chiplet can further comprise: an analog-to-digital converter (ADC) configured to convert analog output from the first amplifier to a digital output; and a buffer electrically coupled to a reference input of the ADC.

Additionally or alternatively, in some examples, the sampling circuitry can further comprise a second sampling capacitor and a second switch electrically coupled to an input of the buffer. Additionally or alternatively, in some examples, the second sampling capacitor is electrically coupled to a second input voltage pin via the second switch.

Additionally or alternatively, in some examples, the sampling circuitry can be further configured to: during an analog quiet period and with the second switch closed, sample a voltage of the second sampling capacitor to obtain a second reference voltage; and after obtaining the second reference voltage, opening the second switch to disconnect the second input voltage pin from the second sampling capacitor.

Some examples of the disclosure are directed to an electronic device. The electronic device can comprise sampling circuitry including a first sampling capacitor and a first switch electrically coupled to an input of a first amplifier, the first sampling capacitor electrically coupled to a first input voltage pin via the first switch. Additionally or alternatively, in some examples, the sampling circuitry can be configured to: during an analog quiet period and with the first switch closed, sample a voltage of the first sampling capacitor to obtain a first reference voltage; and after obtaining the first reference voltage, open the first switch to disconnect the first input voltage pin from the first sampling capacitor.

Additionally or alternatively, in some examples, the first amplifier is configured with a feedback path that includes a feedback impedance between a second input of the first amplifier and an output of the first amplifier.

Additionally or alternatively, in some examples, the electronic device can further comprise an integrated touch screen having a plurality of micro light emitting diodes (micro-LEDs) and a plurality of electrodes coupled to cathode terminals of the plurality of micro-LEDs.

Additionally or alternatively, in some examples, the electronic device can further comprise a chiplet. Additionally or alternatively, in some examples, the chiplet comprises the sampling circuitry.

Additionally or alternatively, in some examples, the sampling circuitry further comprises a mixer coupled to the output of the first amplifier.

Additionally or alternatively, in some examples, the sampling circuitry is configured to be coupled to the plurality of micro-LEDs and the plurality of electrodes. Additionally or alternatively, in some examples, the sampling circuitry can be configured to during an active period and with the first switch opened, operate the first amplifier using the first reference voltage stored in the first sampling capacitor. Additionally or alternatively, in some examples, the first amplifier includes measuring a capacitance of the plurality of electrodes coupled to the first amplifier. Additionally or alternatively, in some examples, the sampling circuitry is further configured to operate the mixer to demodulate the output of the first amplifier with a demodulation signal.

Additionally or alternatively, in some examples, the mixer is a differential mixer. Additionally or alternatively, in some examples, the sampling circuitry can further comprise: a single-ended-to-differential conversion circuit. Additionally or alternatively, in some examples, the output of the first amplifier is coupled to a first input of the single-ended-to-differential conversion circuit, and differential outputs of the single-ended-to-differential conversion circuit are coupled to differential inputs of the differential mixer.

Additionally or alternatively, in some examples, the sampling circuitry can further comprise: an analog-to-digital converter (ADC) configured to convert analog output from the first amplifier to a digital output; and a buffer electrically coupled to a reference input of the ADC.

Additionally or alternatively, in some examples, the sampling circuitry can further comprise a second sampling capacitor and a second switch electrically coupled to an input of the buffer, the second sampling capacitor electrically coupled to a second input voltage pin via the second switch.

Additionally or alternatively, in some examples, the sampling circuitry can be further configured to: during an analog quiet period and with the second switch closed, sample a voltage of the second sampling capacitor to obtain a second reference voltage; and after obtaining the second reference voltage, opening the second switch to disconnect the second input voltage pin from the second sampling capacitor.

Some examples of the disclosure are directed to a chiplet for an electronic device having an integrated touch screen. In some examples, the chiplet can comprise: a first amplifier; sampling circuitry including a first sampling capacitor and a first switch electrically coupled to a first input of the first amplifier, the first sampling capacitor electrically couplable to a first input voltage pin via the first switch; a single-ended-to-differential conversion circuit. Additionally or alternatively, in some examples, an output of the first amplifier is coupled to a first input of the single-ended-to-differential conversion circuit. Additionally or alternatively, in some examples, the chiplet can further comprise a mixer coupled to outputs of the single-ended-to-differential conversion circuit.

Additionally or alternatively, in some examples, the first amplifier is configured with a feedback path that includes a feedback impedance between a second input of the first amplifier and an output of the first amplifier.

Additionally or alternatively, in some examples, the chiplet can further comprise an analog-to-digital converter (ADC) configured to convert analog output from the first amplifier to a digital output. Additionally or alternatively, in some examples, the ADC is coupled to an output of the mixer. Additionally or alternatively, in some examples, the chiplet can further comprise a buffer electrically coupled to a first reference input of the ADC.

Additionally or alternatively, in some examples, the sampling circuitry further comprises a second sampling capacitor and a second switch electrically coupled to an input of the buffer, the second sampling capacitor electrically couplable to a second input voltage pin via the second switch.

Additionally or alternatively, in some examples, the chiplet can further comprise: an analog multiplexer coupled to an output of the buffer; and switch-capacitor circuitry coupled to an output of the analog multiplexer. Additionally or alternatively, in some examples, the switch-capacitor circuitry can comprise: a plurality of first switches and a plurality of second switches; and a first capacitor and a second capacitor. Additionally or alternatively, in some examples, a first output and a second output of the switch-capacitor circuitry are coupled to the first reference input and a second reference input of the ADC, respectively.

Additionally or alternatively, in some examples, the mixer is a differential mixer. Additionally or alternatively, in some examples, differential outputs of the single-ended-to-differential conversion circuit are coupled to differential inputs of the differential mixer.

Some examples of the disclosure are directed to a chiplet for an electronic device having an integrated touch screen. In some examples, the chiplet can comprise: touch sensing circuitry including a first amplifier; an analog-to-digital converter (ADC) configured to convert analog output from the first amplifier to a digital output; and sampling circuitry. Additionally or alternatively, in some examples, the sampling circuitry can include: a first sampling capacitor and a first switch electrically coupled to a first input of the first amplifier; and a second sampling capacitor and a second switch electrically coupled to a first reference input of the ADC.

Additionally or alternatively, in some examples, the chiplet can further comprise a single-ended-to-differential conversion circuit. Additionally or alternatively, in some examples, an output of the first amplifier is coupled to a first input of the single-ended-to-differential conversion circuit. Additionally or alternatively, in some examples, the chiplet can further comprise a mixer coupled between outputs of the single-ended-to-differential conversion circuit and an input of the ADC.

Additionally or alternatively, in some examples, the chiplet can further comprise a buffer electrically coupled between the second switch and the first reference input of the ADC.

Additionally or alternatively, in some examples, the chiplet can further comprise: an analog multiplexer coupled to an output of the buffer; and switch-capacitor circuitry coupled to an output of the analog multiplexer. Additionally or alternatively, in some examples, the switch-capacitor circuitry can comprise: a plurality of first switches and a plurality of second switches; and a first capacitor and a second capacitor. Additionally or alternatively, in some examples, a first output and a second output of the switch-capacitor circuitry are coupled to the first reference input and a second reference input of the ADC, respectively.

Additionally or alternatively, in some examples, the first amplifier is configured with a feedback path that includes a feedback impedance between a second input of the first amplifier and an output of the first amplifier.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A chiplet for an electronic device having an integrated touch screen, the chiplet comprising:
   sampling circuitry including a first sampling capacitor and a first switch electrically coupled to a first input of a first amplifier, the first sampling capacitor electrically coupled to a first input voltage pin via the first switch, the sampling circuitry configured to:
      during an analog quiet period and with the first switch closed, sample a voltage of the first sampling capacitor to obtain a first reference voltage; and
      after obtaining the first reference voltage, open the first switch to disconnect the first input voltage pin from the first sampling capacitor.

2. The chiplet of claim 1, wherein the first amplifier is configured with a feedback path that includes a feedback impedance between a second input of the first amplifier and an output of the first amplifier.

3. The chiplet of claim 1, wherein the integrated touch screen of the electronic device comprises a plurality of micro light emitting diodes (micro-LEDs) and a plurality of electrodes coupled to cathode terminals of the plurality of micro-LEDs.

4. The chiplet of claim 3, further comprising:
   a mixer coupled to the output of the first amplifier.

5. The chiplet of claim 4, wherein the sampling circuitry is configured to be coupled to the plurality of micro-LEDs and the plurality of electrodes and configured to:
   during an active period and with the first switch opened, operate the first amplifier using the first reference voltage stored in the first sampling capacitor;
   wherein operating the first amplifier includes measuring a capacitance of the plurality of electrodes coupled to the first amplifier; and
   operate the mixer to demodulate the output of the first amplifier with a demodulation signal.

6. The chiplet of claim 4, wherein the mixer is a differential mixer, the chiplet further comprising:
   a single-ended-to-differential conversion circuit, wherein the output of the first amplifier is coupled to a first input of the single-ended-to-differential conversion circuit, and differential outputs of the single-ended-to-differential conversion circuit are coupled to differential inputs of the differential mixer.

7. The chiplet of claim 1, further comprising:
   an analog-to-digital converter (ADC) configured to convert analog output from the first amplifier to a digital output; and
   a buffer electrically coupled to a reference input of the ADC.

8. The chiplet of claim 7, wherein the sampling circuitry further comprises a second sampling capacitor and a second switch electrically coupled to an input of the buffer, the second sampling capacitor electrically coupled to a second input voltage pin via the second switch.

9. The chiplet of claim 8, wherein the sampling circuitry is further configured to:
during an analog quiet period and with the second switch closed, sample a voltage of the second sampling capacitor to obtain a second reference voltage; and
after obtaining the second reference voltage, opening the second switch to disconnect the second input voltage pin from the second sampling capacitor.

10. An electronic device comprising:
sampling circuitry including a first sampling capacitor and a first switch electrically coupled to an input of a first amplifier, the first sampling capacitor electrically coupled to a first input voltage pin via the first switch, the sampling circuitry configured to:
during an analog quiet period and with the first switch closed, sample a voltage of the first sampling capacitor to obtain a first reference voltage; and
after obtaining the first reference voltage, open the first switch to disconnect the first input voltage pin from the first sampling capacitor.

11. The electronic device of claim 10, wherein the first amplifier is configured with a feedback path that includes a feedback impedance between a second input of the first amplifier and an output of the first amplifier.

12. The electronic device of claim 10, further comprising an integrated touch screen having a plurality of micro light emitting diodes (micro-LEDs) and a plurality of electrodes coupled to cathode terminals of the plurality of micro-LEDs.

13. The electronic device of claim 10, further comprising a chiplet, wherein the chiplet comprises the sampling circuitry.

14. The electronic device of claim 12, wherein the sampling circuitry further comprises:
a mixer coupled to an output of the first amplifier.

15. The electronic device of claim 14, wherein the sampling circuitry is configured to be coupled to the plurality of micro-LEDs and the plurality of electrodes and configured to:
during an active period and with the first switch opened, operate the first amplifier using the first reference voltage stored in the first sampling capacitor;
wherein operating the first amplifier includes measuring a capacitance of the plurality of electrodes coupled to the first amplifier; and
operate the mixer to demodulate the output of the first amplifier with a demodulation signal.

16. The electronic device of claim 14, wherein the mixer is a differential mixer, the sampling circuitry further comprising:
a single-ended-to-differential conversion circuit, wherein the output of the first amplifier is coupled to a first input of the single-ended-to-differential conversion circuit, differential outputs of the single-ended-to-differential conversion circuit are coupled to differential inputs of the differential mixer.

17. The electronic device of claim 10, wherein the sampling circuitry further comprises:
an analog-to-digital converter (ADC) configured to convert analog output from the first amplifier to a digital output; and
a buffer electrically coupled to a reference input of the ADC.

18. The electronic device of claim 17, wherein the sampling circuitry further comprises a second sampling capacitor and a second switch electrically coupled to an input of the buffer, the second sampling capacitor electrically coupled to a second input voltage pin via the second switch.

19. The electronic device of claim 18, wherein the sampling circuitry is further configured to:
during an analog quiet period and with the second switch closed, sample a voltage of the second sampling capacitor to obtain a second reference voltage; and
after obtaining the second reference voltage, opening the second switch to disconnect the second input voltage pin from the second sampling capacitor.

20. A chiplet for an electronic device having an integrated touch screen, the chiplet comprising:
a first amplifier;
sampling circuitry including a first sampling capacitor and a first switch electrically coupled to a first input of the first amplifier, the first sampling capacitor electrically couplable to a first input voltage pin via the first switch, the sampling circuitry configured to:
during an analog quiet period and with the first switch closed, sample a voltage of the first sampling capacitor to obtain a first reference voltage; and
after obtaining the first reference voltage, open the first switch to disconnect the first input voltage pin from the first sampling capacitor;
a single-ended-to-differential conversion circuit, wherein an output of the first amplifier is coupled to a first input of the single-ended-to-differential conversion circuit; and
a mixer coupled to outputs of the single-ended-to-differential conversion circuit.

* * * * *